(12) United States Patent
Evers et al.

(10) Patent No.: US 7,477,193 B2
(45) Date of Patent: Jan. 13, 2009

(54) METHOD AND SYSTEM FOR ELLIPTICAL-BASED SURVEILLANCE

(75) Inventors: Carl A. Evers, Vienna, VA (US); Yue Xie, Fairfax, VA (US); Thomas J. Breen, Tyngsborough, MA (US)

(73) Assignee: ERA Systems Corporation, Reston, VA (US)

(*) Notice: Subject to any disclaimer, the term of this patent is extended or adjusted under 35 U.S.C. 154(b) by 309 days.

(21) Appl. No.: 11/429,926

(22) Filed: May 8, 2006

(65) Prior Publication Data
US 2007/0040734 A1 Feb. 22, 2007

Related U.S. Application Data

(63) Continuation-in-part of application No. 11/343,079, filed on Jan. 30, 2006, now Pat. No. 7,375,683, and a continuation-in-part of application No. 11/342,289, filed on Jan. 28, 2006, and a continuation-in-part of application No. 11/203,823, filed on Aug. 15, 2005, and a continuation-in-part of application No. 11/145,170, filed on Jun. 6, 2005, and a continuation-in-part of application No. 10/743,042, filed on Dec. 23, 2003, now Pat. No. 7,132,982, which is a continuation-in-part of application No. 10/638,524, filed on Aug. 12, 2003, now Pat. No. 6,806,829, which is a continuation of application No. 09/516,215, filed on Feb. 29, 2000, now Pat. No. 6,633,259, said application No. 10/743,042 is a continuation-in-part of application No. 10/319,725, filed on Dec. 16, 2002, now Pat. No. 6,812,890.

(60) Provisional application No. 60/123,170, filed on Mar. 5, 1999, provisional application No. 60/440,618, filed on Jan. 17, 2003.

(51) Int. Cl.
*G01S 3/02* (2006.01)
*G01S 13/08* (2006.01)

(52) U.S. Cl. .......................... 342/463; 34/126; 34/453
(58) Field of Classification Search ................. 342/126, 342/450, 453, 457, 463; 701/207, 214, 224
See application file for complete search history.

(56) References Cited

U.S. PATENT DOCUMENTS 3,668,403 A 6/1972 Meilander .................. 701/121

(Continued)

FOREIGN PATENT DOCUMENTS

JP 9-288175 A 11/1994

(Continued)

OTHER PUBLICATIONS

Boeing Subsidiary and Megadata Announce Joint Marketing Agreement, Press Release, Aug. 7, 2003.

(Continued)

*Primary Examiner*—Dao L Phan
(74) *Attorney, Agent, or Firm*—Robert Platt Bell

(57) ABSTRACT

A method and system are provided for performing elliptical-based and hybrid surveillance, performing false target detection and resolution, and performing integrity monitoring using one or more receiving and transmitting elements time synchronized to a common precision time reference, and a central workstation. Antennas for transmitting and receiving elements are located at known positions separated from one another. At a given time, one of the transmitting elements transmits an interrogation signal to one or more targets, which respond to the interrogation with a reply transmission, received by one or more receiving elements. The central workstation calculates each target's ellipse of position with respect to each receiving element, using the interrogator element time of interrogation measurement and each receiving element's time of arrival measurement for the corresponding reply transmission, and then fuses the elliptical line of positions for each receiving element to compute target positions or augment passive surveillance position. At a scheduled time, the one or more transmitting elements transmit a reference signal to the receiving elements(s). The central workstation uses each of the receiving elements time stamped signals to perform integrity monitoring.

45 Claims, 15 Drawing Sheets

U.S. PATENT DOCUMENTS

| | | | |
|---|---|---|---|
| 3,705,404 A | 12/1972 | Chisholm | 343/112 R |
| 3,792,472 A | 2/1974 | Payne et al. | 342/32 |
| 4,167,006 A | 9/1979 | Funatsu et al. | 343/6.5 LC |
| 4,196,474 A | 4/1980 | Buchanan et al. | 364/461 |
| 4,224,669 A | 9/1980 | Brame | 701/8 |
| 4,229,737 A | 10/1980 | Heldwein et al. | 343/6 R |
| 4,359,733 A | 11/1982 | O'Neill | 342/36 |
| 4,454,510 A | 6/1984 | Crow | 343/5 |
| 4,524,931 A | 6/1985 | Nilsson | 246/167 |
| 4,646,244 A | 2/1987 | Bateman | 701/301 |
| 4,688,046 A | 8/1987 | Schwab | 342/456 |
| 4,782,450 A | 11/1988 | Flax | 364/461 |
| 4,811,308 A | 3/1989 | Michel | 367/136 |
| 4,914,733 A | 4/1990 | Gralnick | 340/961 |
| 5,075,694 A | 12/1991 | Donnangelo et al. | 342/455 |
| 5,144,315 A | 9/1992 | Schwab et al. | 342/49 |
| 5,153,836 A | 10/1992 | Fraughton et al. | 364/461 |
| 5,191,342 A | 3/1993 | Alsup et al. | 342/465 |
| 5,260,702 A | 11/1993 | Thompson | 340/970 |
| 5,262,784 A | 11/1993 | Drobnicki et al. | 342/45 |
| 5,268,698 A | 12/1993 | Smith et al. | 342/450 |
| 5,283,574 A | 2/1994 | Grove | 340/970 |
| 5,317,316 A | 5/1994 | Sturm et al. | 342/30 |
| 5,365,516 A * | 11/1994 | Jandrell | 370/335 |
| 5,374,932 A | 12/1994 | Wyschogrod et al. | 342/36 |
| 5,381,140 A | 1/1995 | Kuroda et al. | 340/961 |
| 5,402,116 A | 3/1995 | Ashley | 340/870.1 |
| 5,454,720 A | 10/1995 | FitzGerald et al. | 434/27 |
| 5,506,590 A | 4/1996 | Minter | 342/462 |
| 5,528,244 A | 6/1996 | Schwab | 342/37 |
| 5,570,095 A | 10/1996 | Drouilhet, Jr. et al. | 342/357 |
| 5,596,326 A | 1/1997 | Fitts | 342/30 |
| 5,596,332 A | 1/1997 | Coles et al. | 342/455 |
| 5,627,546 A | 5/1997 | Crow | 342/352 |
| 5,629,691 A | 5/1997 | Jain | 340/961 |
| 5,666,110 A | 9/1997 | Paterson | 340/970 |
| 5,680,140 A | 10/1997 | Loomis | 342/357 |
| 5,714,948 A | 2/1998 | Farmakis et al. | 340/961 |
| 5,752,216 A | 5/1998 | Carlson et al. | 701/120 |
| 5,774,829 A | 6/1998 | Cisneros et al. | 701/213 |
| 5,781,150 A | 7/1998 | Norris | 342/357 |
| 5,839,080 A | 11/1998 | Muller | 701/9 |
| 5,867,804 A | 2/1999 | Pilley et al. | 701/120 |
| 5,920,278 A * | 7/1999 | Tyler et al. | 342/33 |
| 5,999,116 A | 12/1999 | Evers | 342/36 |
| 6,049,304 A | 4/2000 | Rudel et al. | 342/357.08 |
| 6,085,150 A | 7/2000 | Henry et al. | 701/301 |
| 6,088,634 A | 7/2000 | Muller | 701/9 |
| 6,092,009 A | 7/2000 | Glover | 701/14 |
| 6,094,169 A | 7/2000 | Smith et al. | 342/465 |
| 6,122,570 A | 9/2000 | Muller | 701/9 |
| 6,127,944 A | 10/2000 | Daly | 340/963 |
| 6,133,867 A | 10/2000 | Eberwine et al. | 342/29 |
| 6,138,060 A | 10/2000 | Conner | 701/9 |
| 6,195,046 B1 * | 2/2001 | Gilhousen | 342/457 |
| 6,208,284 B1 | 3/2001 | Woodell et al. | 342/30 |
| 6,211,811 B1 | 4/2001 | Evers | 342/36 |
| 6,219,592 B1 | 4/2001 | Muller et al. | 701/9 |
| 6,292,721 B1 | 9/2001 | Conner et al. | 701/9 |
| 6,314,363 B1 | 11/2001 | Pilley et al. | 701/120 |
| 6,347,263 B1 | 2/2002 | Johnson et al. | 701/14 |
| 6,380,870 B1 | 4/2002 | Conner et al. | 340/970 |
| 6,384,783 B1 | 5/2002 | Smith et al. | 342/387 |
| 6,445,310 B1 | 9/2002 | Bateman et al. | 340/970 |
| 6,448,929 B1 | 9/2002 | Smith et al. | 342/456 |
| 6,463,383 B1 | 10/2002 | Baiada et al. | 701/120 |
| 6,469,664 B1 | 10/2002 | Michaelson et al. | 342/357.13 |
| 6,477,449 B1 | 11/2002 | Conner et al. | 701/4 |
| 6,567,043 B2 | 5/2003 | Smith et al. | 342/450 |
| 6,571,155 B2 | 5/2003 | Carriker et al. | 701/3 |
| 6,606,034 B1 | 8/2003 | Muller et al. | 340/970 |
| 6,633,259 B1 | 10/2003 | Smith et al. | 342/456 |
| 6,691,004 B2 | 2/2004 | Johnson | 701/14 |
| 6,707,394 B2 | 3/2004 | Ishihara et al. | 340/970 |
| 6,710,723 B2 | 3/2004 | Muller | 340/970 |
| 6,750,815 B2 | 6/2004 | Michaelson et al. | 342/357.13 |
| 6,789,011 B2 | 9/2004 | Baiada et al. | 701/120 |
| 6,812,890 B2 | 11/2004 | Smith et al. | 342/454 |
| 6,873,903 B2 | 3/2005 | Baiada et al. | 701/120 |
| 6,885,340 B2 | 4/2005 | Smith et al. | 342/465 |
| 6,927,701 B2 | 8/2005 | Schmidt et al. | 340/959 |
| 6,930,638 B2 | 8/2005 | Lloyd et al. | 342/453 |
| 6,992,626 B2 | 1/2006 | Smith | 342/454 |
| 7,123,169 B2 | 10/2006 | Farmer et al. | 340/945 |
| 7,123,192 B2 | 10/2006 | Smith et al. | 342/455 |
| 7,126,534 B2 | 10/2006 | Smith et al. | 342/456 |
| 2002/0021247 A1 | 2/2002 | Smith et al. | 342/450 |
| 2003/0009267 A1 | 1/2003 | Dunsky et al. | 701/4 |
| 2004/0004554 A1 | 1/2004 | Srinivasan et al. | 340/870.01 |
| 2004/0225432 A1 | 11/2004 | Pilley et al. | 701/120 |
| 2005/0021283 A1 | 1/2005 | Brinton et al. | 702/150 |
| 2005/0046569 A1 | 3/2005 | Spriggs et al. | 340/551 |

FOREIGN PATENT DOCUMENTS

| | | |
|---|---|---|
| JP | 6-342061 A | 12/1994 |
| JP | 8-146130 A | 5/1996 |
| JP | 9-119983 A | 11/1996 |

OTHER PUBLICATIONS

Federal Airways & Airspace, Inc. Because Accuracy Matters, Feb. 2003, Jan. 2002.

VDL4 TM Alignment with DO-242A (RTCA ADS-B MASPS) WG51/SG2, NASA, Sep. 2003.

Method to Provide System-Wide ADS-B Back-Up, Validation, and Security, A. Smith et al. 25th AIAA/IEEE Digital Avionics Systems Conference, Oct. 15, 2006.

*Positive Identification of Aircraft on Surface Movement Area—Results of FAA Trials*, 10th Annual International AeroSense Symposium, Orlando, Florida, Apr. 1996.

*Surveillance Monitoring of Parallel Precision Approaches in a Free Flight Environment*, AIAA 16th Annual Digital Avionics Systems Conference, Oct. 1997.

*Analysis of ADS-B, ASDE-3 and Multilateration Surveillance Performance*—NASA Atlanta Demonstration Presented at the AIAA 17th Annual Digital Avionics Systems Conference in Oct. 1998.

*Application of ADS-B for Airport Surface Surveillance*, Daniel Hicok, Derrick Lee IEEE AIAA 17th Annual Digital Avionics Conference, 1998.

*Atlanta Hartsfield International Airport—Results of FAA Trials to Accurately Locate/Identify Aircraft on the Airport Movement Area*, IEEE Plans, Atlanta, GA, Apr. 1996.

*Evaluation of Airport Surface Surveillance Technologies*, IEEE Radar 96 conference, Beijing, China, Oct. 1996.

*Improved Location/Identification of Aircraft/Ground Vehicles on Airport Movement Areas—Results of FAA Trials*, Institute of Navigation in Santa Monica, CA, Jan. 1996.

*Sensis News*, http://www.sensis.com/docs/128/ © 1999-2006.

*Roke Radar, Design and development of miniature radars and fuze sensors through to major radar programme builds*, http://www.roke.co.uk/skills/radar/, © 2006.

*Acoustic System for Aircraft Detection and Tracking, based on Passive Microphone Arrays*. Caronna, Rosello, Testa, 148th Meeting of the Acoustical Society of America, http://pcfite.ing.uniroma1.it/upload/research/4psp711079482021710.pdf Nov. 2004.

*Cel-Loc How We Do It, Technology Overview*, http://www.cell-loc.com/how_tech.html, Oct. 2, 2006 (original date unknown).
*Super-Radar, Done Dirt Cheap*, http://www.businessweek.com/magazine/content/03_42/b3854113.htm BusinessWeek Online, Oct. 20, 2003.
*Methods to Provide System-Wide ADS-B Back-Up, Validation and Security*, A. Smith, R. Cassell, T. Breen, R. Hulstrom, C. Evers, 25th AIAA/IEEE Digital Avionics Systems Conference, Oct. 15, 2006.
Damarel Systems International, LTD, Travel Automation Specialists, © 2004, www.dameral.com.
Airfield Pavement Computer Software, Mar. 23, 2005, Transport Canada https://www.tc.gc.ca/CivilAviation/International/Technical/Pavement/software.htm.
ARA Transportation, © 2004, http://www.araworldwide.com/expertise/industry/transporation.htm.
*The Twilight Zone, Can Wide-Area Multilateration Systems Become A Nightmare for MSSR Producers?* Aircraft Traffic Technology International 2005, Vladimir Manda, Viktor Sotona.
*Safety, Performance, and Interoperability Requirements Document for ADS-B NRA Application*, European Organisation for Civil Avaiation Equipment, Dec. 2005.
Passive Surveillance Using Multilateration, Roke Manor Research website (2003).
Letter from Marc Morgan, Siemens, Feb. 10, 2006.
*Required Navigation Performance (RNP) and Area Navigation (RNAV)*, Boeing, Aug. 2000.
*System-Wide ADS-B Back-Up and Validation*, A. Smith, R. Cassell, T. Breen, R. Hulstrom, C. Evers, 2006 Integrated Communications, Navigation, and Surveillance Conference.
Required Navigation Performance (RNP) Another step towards global implementation of CNS/ATM, Anita Trotter-Cox, Assessment Compliance Group, Inc. Published in Professional Pilot Magazine, Jun. 1999.
Traffic Alert System Technical Design Summary, Final Report, Apr. 1994 (Baldwin et al.).
GPS Relative Accuracy for Collision Avoidance, Institute of Navigation Technical Meeting, Jan. 1997 (Rudel et al.).
Cassell, R., Smith A., Cohen, B., Yang, E., Sleep, B., A Prototype Aircraft Performance Risk Assessment Model, Final Report, Rannoch Corporation, Feb. 28, 2002.
Cassell, R., Smith A., Cohen, B., Yang, E., Sleep, B., Esche, J., Aircraft Performance Risk Assessment Model (APRAM), Rannoch Corporation, Nov. 30, 2002.
Cox, E., A., Fuzzy Logic For Business and Industry, Charles River Media, 1995, Chapter 5.
Smith, A., Cassell, R., Cohen, B., An approach to Aircraft Performance Risk Assessment Modeling, Final Report, Rannoch Corporation, Mar. 1999.
M.L. Wood and R. W. Bush, "Multilateration on Mode S and ATCRBS Signals at Atlanta's Hartsfield Airport", Lincoln Laboratory, M.I.T., Jan. 8, 1998.
Aermod: Description of Model Formulation (Version 02222) EPA 454/R-02-002d, Oct. 21, 2002.
FAA Integrated Noise Model, www.faa.gov, current release INM 6.1 (Mar. 4, 2003).
"Flight Explorer News: Flight Explorer and Lochard Team to Provide Enhanced Flight Tracking for Customers Worldwide", Apr. 28, 2003, http://www.flightexplorer/com/News/press%20releases/pr042803.asp.
Source Code received by Rannoch Corp. from FAA, circa 1998.
"A Routine that converts an American Mode S address into its corresponding 'N' number string", Ken Banis, Feb. 17, 1992.
"Description of the U.S. Algorithm for Assigning Mode A Addresses", Robert D. Grappel, M.I.T. Lincoln Laboratory, Nov. 1991.
"Program to convert Mode S address to U.S. Tail Number", R.D. Grappel, M.I.T. Lincoln Laboratory, 1991.
"Program to convert U.S. aircraft tail numbers to Mode S code", R.D. Grappel, M.I.T. Lincoln Laboratory, 1991.
"ADSE and Multilateration Mode-S Data Fusion for Location and Identification on Airport Surface", J.G. Herraro J.A. Portas, F.J. Rodriguez,(*IEEE 1999 Radar Conference Proceedings*, pp. 315-320, Apr. 20-22, 1999).
D.C. Rickard, D.J. Sherry, S.J. Taylor, "The development of a prototype aircraft-height monitoring unit utilising an SSR-based difference in time of arrival technique", International Conference Radar 92 (Conf. Publ. No. 365), 1992, p. 250-3.
D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.
Request for Proposal for Acquisition of Airport Noise and Operations Monitoring System (NOMS), Indianapolis Airport Authority, Oct. 21, 2003.
Technical Specifications for a Aircraft Flight Track and Noise Management System for the Regional Airport Authority of Louisville and Jefferson County Prepared by: Harris Miller Miller & Hanson Inc. 15 New England Executive Park Burlington, MA 01803 HMMH Report No. 298950, May 16, 2003.
"Overview of the FAA ADS-B Link Decision", John Scardina, Direction, Office of System Architecture and Investment Analysis, Federal Aviation Adminstration, Jun. 7, 2002.
"Ground-Based Transceiver (GBT) For Broadcast Services Using the Universal Access Transceiver (UAT) Data Link", FAA-E-2973, Department of Transportation, Federal Aviation Administration, Jan. 15, 2004.
"Wide Area Multilateration Report on EATMP TRS 131/04 Version 1.1", NLR-CR-2004-472, Roke Manor Research, Nov. 2004.
J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).
D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.
D. E. Manolakis and C. C. Lefas, Aircraft geometric height computation using secondary surveillance radar range differences,☐ IEE Proceedings-F, Radar, Sonar, Navigation, vol. 141, No. 2, pp. 139-148, 1994.
GPS Risk Assessment Study, Final Report, T.M. Corrigan et al., John Hopkins university, Applied Physics Laboratory, Jan. 1999.
Aircraft Noise Report, vol. 17, No. 1, Jan. 31, 2005.
ASA MASPS—Change Issue, James Maynard, Oct. 21, 2002.
ADS-B, Automatic Dependent Surveillance—Broadcast Will ADS-B Increase Safety and Security for Aviation?, First written Mar. 1999 revised Jul. 2000, by Darryl H. Phillips AirSport Corporation—1100 West Cherokee—Sallisaw OK 74955 voice: 918-775-4010—fax: 918-775-4000.
ASA MASPS—Change Issue, Greg Stayton, Aug. 1, 2002.

ASA MASPS—Change Issue, Michael Petri, Oct. 23, 2002.
ASA MASPS—Change Issue, J. Stuart Searight, Nov. 18, 2002.
ASA MASPS—Change Issue, Michael Petri, Dec. 16, 2002.
ASA MASPS—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.
A Radar Substitute—David Hughes, Aviation Week & Space Technology, Mar. 7, 2005.
Statement of ACI-NA and AAAE on Airport Improvement Program Reauthorization before the Senate Aviation Subcommittee on Feb. 12, 1998. David Plavin.
Draft Proposal for the Amendment of the Sub-Cap on Off-Peak Takeoff and Landing Charges at Dublin Airport, Commission for Aviation Regulation, Nov. 23, 2003.
Aviation Infrastructure: Challenges Associated with Building and Maintaining Runways, General Accounting Office, GAO-01-90-T, Oct. 5, 2000.
Airfield Pavement: Keeping Nations Runways in Good Condition Could Require Substantially higher Spending, GAO/RCED-98-226, Jul. 1998.
Albany International Airport Pavement Management System, Albany, New York, Albany International Airport GIS-Based Pavement and Facilities Management, Fall, 2002.
Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.
Micropaver, Dr. M.Y. Shahin, Cecer-Cff Champaign, IL May 2, 2005.
Raytheon Systems Limited Launches a Unique Solution for ADS-B,. Jan. 19, 2005, Raytheon Corp. http://www.raytheon.co.uk/highlights/ATMS.html.
Raytheon Systems Limited's ADS-B Solution Prised by International Sir Tzraffic Authorites, Feb. 2, 2005, http://www.raytheon.co.uk/news_room/news/press_02022005.pdf.
Protest Letter dated May 16, 2002 from Otto M. Wildensteiner, U.S. Department of Transportation, Washington, DC.
"Comparison of Claims in Application Serial No. 09/971,972, with Prior Art", May 16, 2002, Otto M. Wildensteiner, Department of Transportation, Washington, DC.
"Minimum Aviation System Performance Standards for Automatic Dependent Surveillance Broadcast (ADS-B)", RCTA, Inc. Washington, DC, © 1998.
"Runway Incursion Reduction Program Dallas-Ft. Worth Formal Evaluation Report, Final Report", Trios Associates, Inc. Dec. 21, 2000.
"TIS-B DFW Application for Airport Surface Situational Awareness", Trios Associates, Inc., Sep. 6, 2000.
"A Prototype Transceiver for Evaluating An Integrated Broadcast Data Link Architecture", Chris Moody & Warren Wilson, RCTA SC-186, Aug. 17, 1995, RTCA Paper No. 449-95/SC186-033.
"The Universal Access Transceiver (UAT)", Warren Wilson & Chris Moody, May 10, 1995.
"Terminal Area Productivity (TAP) Study Low Visibility Landing and Surface Operations (LVLASO) Demonstration Report" Surface Surveillance Products Team (AND-410) Sep. 4, 1998.
"Phase I—Operational Evaluation Final Report Cargo Airline Association ADS-B Program, FAA SafeFlight 21 Program" Apr. 10, 2000.
"Capstone Program Plan Version 1.0", Federal Aviation Administration, Mar. 10, 1999.
"TIS-B Concept and Approach", MITRE, Chris Moody, Feb. 29, 2000.
"RTCA Special Committee 186, Working Group 5 ADS-B UAT MOPS Meeting #2, Proposed Contents and Transmission Rates for ADS-B Messages" Chris Moody, Mitre Corp., Feb. 20, 2001
"Airborne Information Initatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.
"Minutes of SC-186 WG-2 (TIS-B) Meeting", Jun. 13-14, 2000.

* cited by examiner

METHOD AND SYSTEM FOR ELLIPTICAL-BASED SURVEILLANCE

CROSS-REFERENCE TO RELATED APPLICATIONS

This application is a Continuation-In-Part of U.S. patent application Ser. No. 11/343,079, Filed Jan. 30, 2006 and incorporated herein by reference; This application is also a Continuation-In-Part of U.S. patent application Ser. No. 11/342,289 filed Jan. 28, 2006 and incorporated herein by reference; This application is a Continuation-In-Part of U.S. patent application Ser. No. 11/203,823 filed Aug. 15, 2005 and incorporated herein by reference; This application is a Continuation-In-Part of U.S. patent application Ser. No. 11/145,170 filed on Jun. 6, 1005 and incorporated herein by reference; This application is a Continuation-In-Part of U.S. patent application Ser. No. 10/743,042 filed Dec. 23, 2003 and incorporated herein by reference; application Ser. No. 10/743,042 is a Continuation-In-Part of U.S. patent application Ser. No. 10/638,524 filed Aug. 12, 2003 and incorporated herein by reference; application Ser. No. 10/638,524 is a Continuation of U.S. patent application Ser. No. 09/516,215 filed Feb. 29, 2000 and incorporated herein by reference; application Ser. No. 09/516,215 claims is a Non Prov. of Provisional U.S. Patent Application Ser. No. 60/123,170 filed Mar. 5, 1999 and incorporated herein by reference; application Ser. No. 10/743,042 is a Continuation-In-Part of U.S. patent application Ser. No. 10/319,725 filed Dec. 16, 2002 and incorporated herein by reference. Application Ser. No. 10/743,042 is a Non Prov. of Provisional U.S. Patent Application Ser. No. 60/440,618 filed Jan. 17, 2003 and incorporated herein by reference.

FIELD OF THE INVENTION

The invention relates to the field of aircraft and ground vehicle surveillance, including target location and identification, false target detection and resolution, and system monitoring, particularly for systems and methods that utilize Time Difference of Arrival (TDOA) techniques.

BACKGROUND OF THE INVENTION

In the current art, a number of systems and methodologies exist for localization of aircraft and ground vehicle targets for Air Traffic Control. These systems provide airport surface, airport terminal area and en-route surveillance.

Primary radar and Secondary Surveillance Radar (SSR) systems are widely used to provide surveillance for Air Traffic Control. Radars use centralized sensor architecture, using a single rotating antenna to provide surveillance. Surveillance position data from several radar systems with overlapping coverage can be fused to provide surveillance over wide coverage areas. Each SSR provides high accuracy target-ranging capability and target angle measurement that degrades with target distance from the SSR. The SSRs are not synchronized to the timing accuracies required to perform precision surveillance via triangulating position between two or more SSRs. Expanding surveillance coverage area requires installing additional radar systems.

A radar system uses a large rotating antenna, which make radars both expensive to acquire and to maintain. Radars are susceptible to false targets in high multi-path environments. These false targets are difficult to detect and eliminate in the surveillance processing. Radar integrity monitoring is supported by fixed radar reflectors or parrot transponders, which are located at known positions within surveillance range of each radar. Failure of a radar to locate a fixed radar reflector or parrot transponder at the known position results in the identification of a system integrity failure. A small number of fixed radar reflectors or transponder parrots are required due to the centralized radar system architecture of a single rotating antenna per radar.

Multilateration systems are used as either an alternative to radar systems or to augment radar system surveillance. Multilateration systems use distributed sensor architecture, whereby a surveillance system will consists of a central workstation and a network of three or more sensors that are geographically separated. The sensors can be configured as receive only, transmit only and receive/transmit. Each sensor is housed in a small electronics enclosure and uses fixed antenna(s). Expanding surveillance coverage requires adding sensors to an existing multilateration system, as opposed to the more expensive route of installing an additional system.

Multilateration systems can be configured for a low probability of false target in high multi-path environments. However, multilateration systems can benefit from new methods to reduce the risk of false targets. Integrity monitoring is supported by reference transmitters or transponders as defined in Minimum Operational Performance Specification for Mode-S Multilateration Systems for use in Advanced Surface Movements Guidance and Control Systems (A-SMGCS), ED-117, incorporated herein by reference, which are located at known positions within surveillance coverage area of the system.

Failure of the multilateration system to locate the fixed reference transmitter or transponder at the known position results in the identification of a system integrity failure. Multilateration system monitoring has been implemented such that that each reference transmitter or transponder is in view of two or more multilateration sensors. However, this monitoring implementation is not practical when the multilateration sensors are separated by more than five kilometers. Terrain and radio horizon constraints require that the reference transmitter or transponder antenna be located high enough to be in view of the multilateration sensors. In some cases, these high sites are either not available or require expensive antenna tower installations.

Thus, it remains a requirement in the art to provide an improved technique for integrity monitoring of multilateration systems, which is relatively inexpensive and easier to implement.

SUMMARY OF THE INVENTION

The present invention provides improved systems and methods for use as a standalone elliptical-based air traffic surveillance system and for use with multilateration surveillance systems. As a standalone system, the method and system of the present invention provides location and identification of aircraft and ground vehicles equipped with transponders. For use with multilateration surveillance systems, the method and system provides hybrid surveillance, false target detection and resolution, and system integrity monitoring of existing multilateration surveillance system.

DETAILED DESCRIPTION OF THE INVENTION

The present invention is now described with reference to the accompanying Figures where like reference numbers denote like elements or steps.

Figure 1:
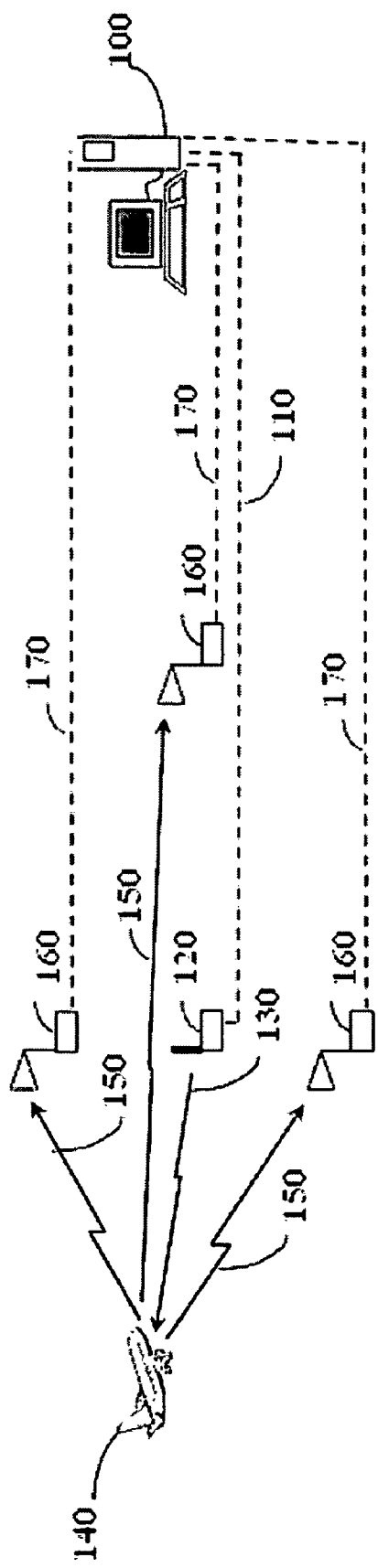
FIG. 1 is a diagram depicting the elliptical-based surveillance concept.

Referring to FIG. 1, in the preferred embodiment, an elliptical-based surveillance ground system comprising one or more 1090 MHz remote receivers 160, one or more 1030 MHz remote transmitters 120, and a central workstation 100 may be used to position and identification surveillance of one or more transponder-equipped aircraft 140. 1090 MHz remote receivers 160 and 1030 MHz remote transmitters 120 are time synchronized to a common high accuracy time reference source, such as Global Positioning System (GPS). 1090 MHz remote receiver 160 with associated antenna is separated in distance from 1030 MHz remote transmitters 120 with associated antenna.

One or more 1030 MHz remote transmitters 120 transmit a 1030 MHz interrogation 130 in accordance with the *Minimum Operational Performance Standards For Traffic Alert And Collision Avoidance System (TCAS) Airborne Equipment,* RTCA/DO-185, incorporated herein by reference. Each 1030 MHz remote transmitter 120 provides the precise time and type of interrogation to central workstation 100 by data message over communications link 110. One or more transponder-equipped aircraft 100 receive 1030 MHz interrogation signal 130. Each transponder-equipped aircraft 100 generates a 1090 MHz reply transmission 150 in accordance with the *Minimum Operational Performance Standards For Air Traffic Control Radar Beacon System/Mode Select (AT-CRBS/MODE S) Airborne Equipment,* RTCA/DO-181, also incorporated herein by reference.

Each 1090 MHz remote receiver 160 receives, measures Time Of Arrival (TOA), and decodes the 1090 MHz reply transmissions 150 from each transponder-equipped aircraft 140. Each 1090 MHz remote receiver 160 sends the TOA and decoded 1090 MHz reply transmissions 150 data to the central workstation 100 over data link 170. Central workstation 100 computes the Round Trip Delay Time (RTDT) for each 1090 MHz remote receiver 160, which equals the 1030 MHz remote transmitter 120 time of transmission (TOT) for 1030 MHz interrogation 130 minus the time that the corresponding 1090 MHz reply transmission 150 TOA at the 1090 MHz remote receiver 160.

Figure 2:
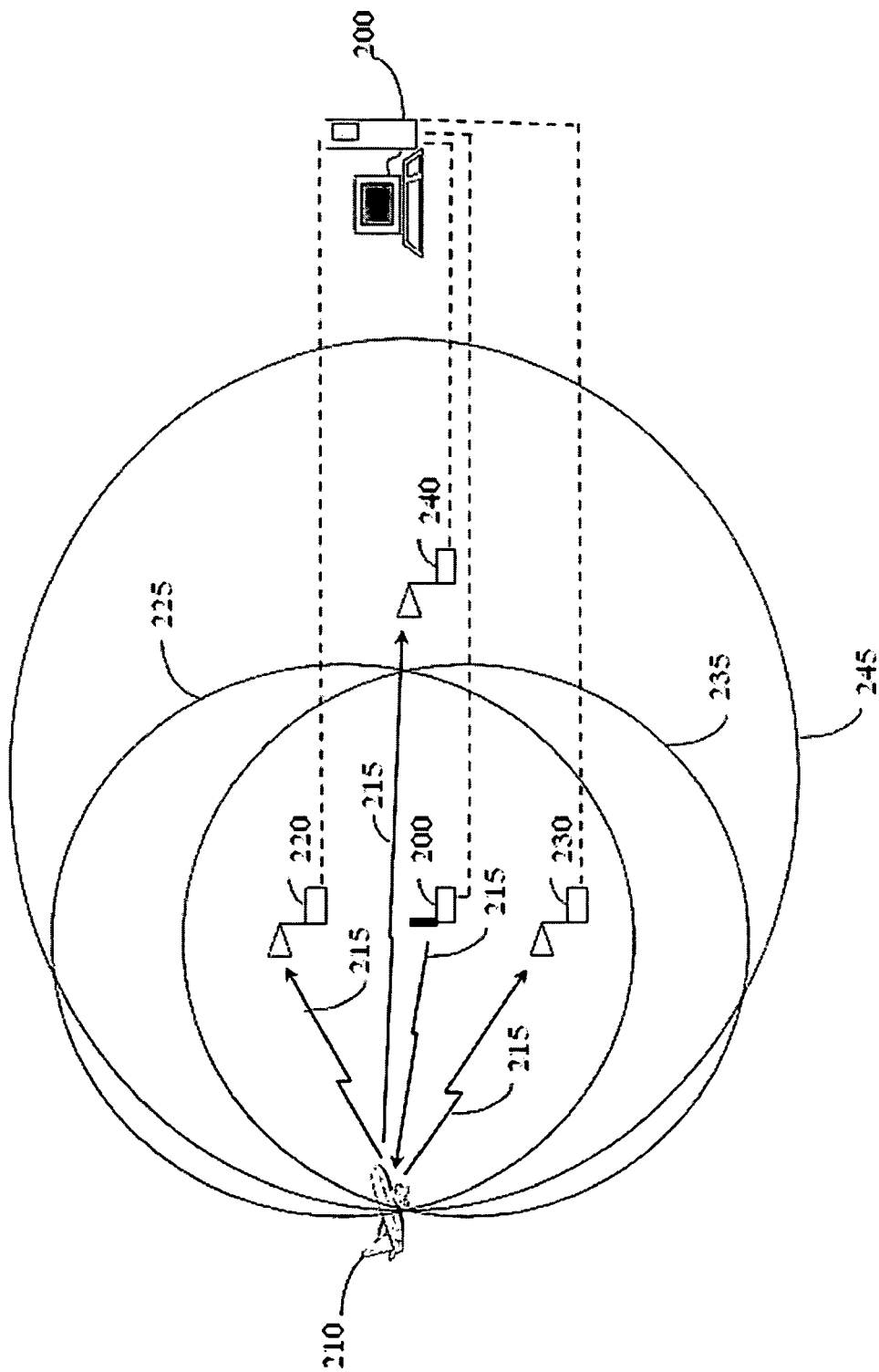
FIG. 2 is a diagram depicting the elliptical-based surveillance position determination concept.

Referring to FIG. 2, central workstation 200 uses the RTDT associated with each 1030 MHz interrogation 215 and corresponding 1090 MHz reply transmissions 150 to compute elliptical-based surveillance position of each aircraft 210. An Ellipse of Position (EOP) 225 is computed for the RTDT for a 1090 MHz remote receiver 220 and 1030 MHz remote transmitter 200 pair. A second EOP 235 is computed for the RTDT for a 1090 MHz remote receiver 230 and 1030 MHz remote transmitter 200 pair. A third EOP 235 is computed for the RTDT for a 1090 MHz remote receiver 230 and 1030 MHz remote transmitters 200 pair. The common intersection point of all EOPs 225 235 245 at the location of transponder-equipped aircraft 210 is computed to be the position of the aircraft. Three or more EOPs are required to provide an unambiguous position solution. The elliptical-based surveillance ground system uses dual solution position updates to reinforce surveillance when only two EOPs are available.

The elliptical-based surveillance ground system shares the following common elements with multilateration surveillance ground systems: one or more 1090 MHz remote receivers 160, one or more 1030 MHz remote transmitters 120, a central workstation 100, communications links 110 170, 1030 MHz interrogation 130, transponder-equipped aircraft 100 and 1090 MHz reply transmissions 150. The elliptical-based surveillance method is combined with the multilateration-based surveillance method to provide a hybrid elliptical/multilateration-based surveillance ground system.

Figure 3:
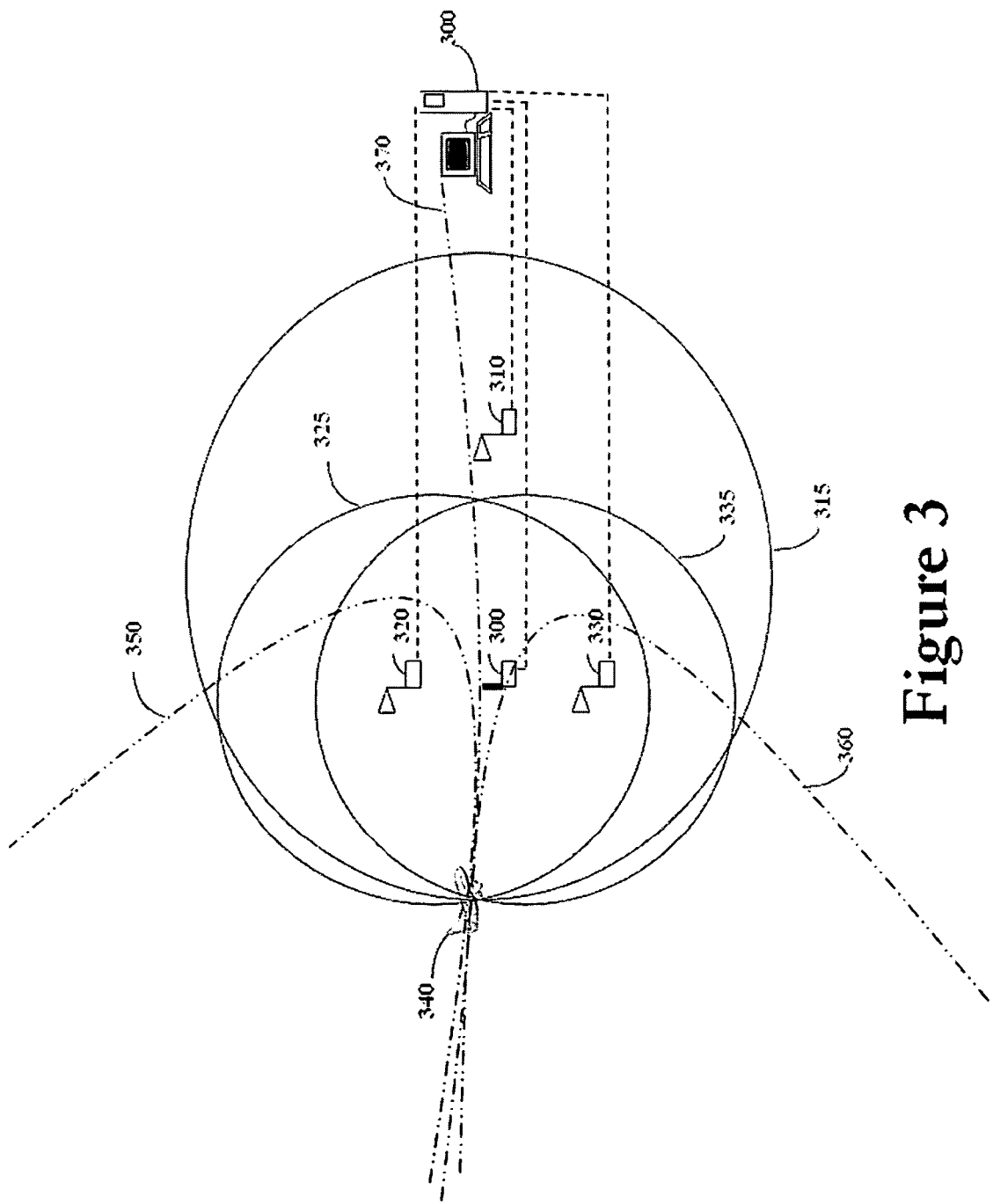
FIG. 3. is a diagram depicting the concept of using the hybrid elliptical/multilateration-based surveillance concept.

FIG. 3 illustrates the concept of hybrid elliptical/multilateration-based surveillance. The multilateration-based surveillance method uses TOA measured at two or more 1090 MHz remote receivers 310, 320, 330 to determine Time Difference of Arrival (TDOA) between the 1090 MHz remote receiver pairs. The central workstation 300 computes target Line of Position (LOP) 350, 360, 370 associated with the TDOA values. The multilateration-based surveillance method determines the location of one or more transponder-equipped aircraft by computing the intersection of two or more LOPs 350, 360, 370. The hybrid elliptical/multilateration-based surveillance method determines the location of one or more transponder-equipped aircraft 340 by computing in the central workstation 300 the intersection point of one or more EOPs 315, 325, 335 and one or more LOPs 350, 360, 370. The hybrid elliptical/multilateration based surveillance ground system updates each aircraft track using any one of the following methods: elliptical-based surveillance method, multilateration-based surveillance method, and the hybrid elliptical/multilateration-based method.

Figure 4:
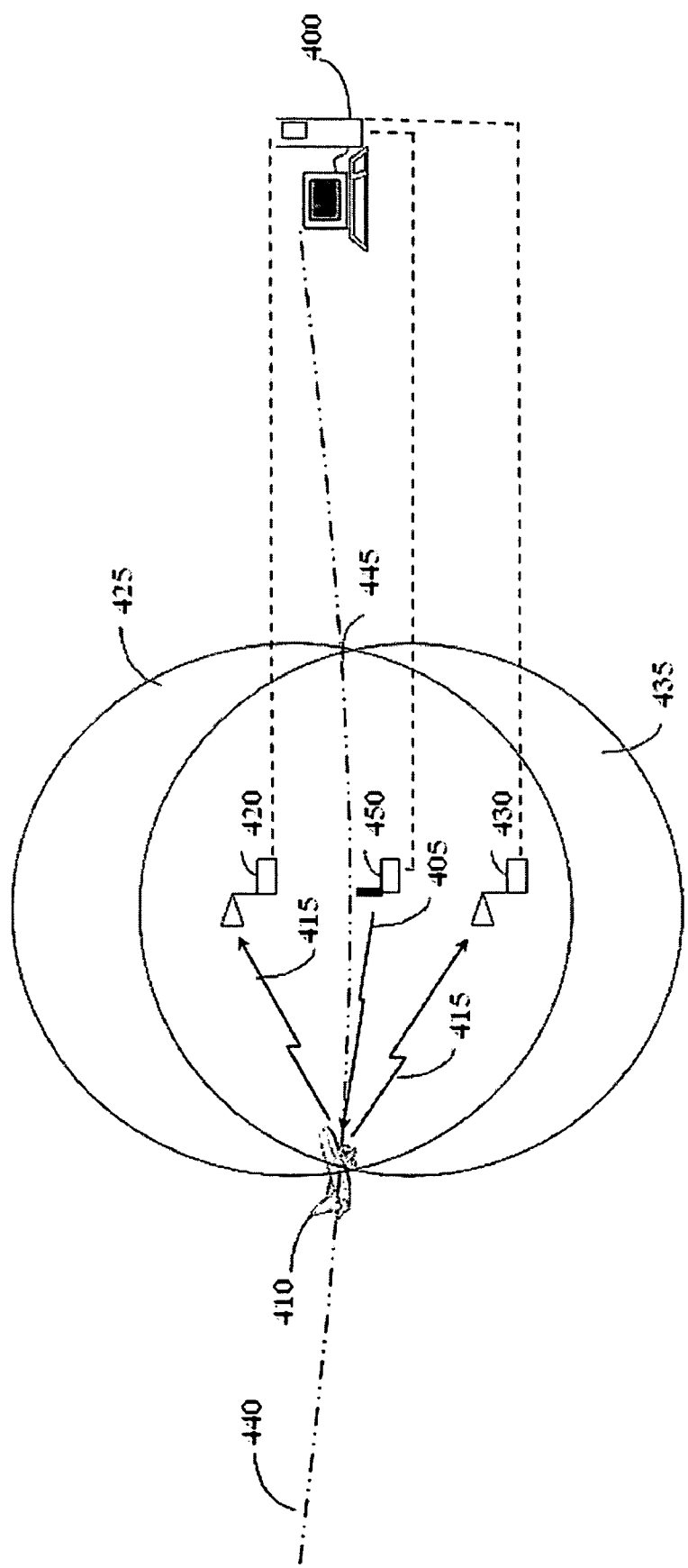
FIG. 4 is a diagram depicting the concept of using reduced sensor count elliptical/multilateration-based surveillance to determine target position.

Referring to FIG. 4, the hybrid elliptical/multilateration-based surveillance ground system determines position of transponder-equipped aircraft 410 from two 1090 MHz remote receivers 420 430 in a reduced sensor count update configuration. A reduced sensor count update configuration occurs when only two 1090 MHz remote receivers 420 430, out of a configuration of two or more 1090 MHz remote receivers, receive a 1090 MHz reply transmission 415 from a transponder-equipped aircraft 410. The 1030 MHz remote transmitter 450 transmits a 1030 MHz interrogation 405 that is received by the transponder-equipped aircraft 410.

In the scenario of FIG. 4, only two 1090 MHz remote receivers 420 430 receive, measure Time Of Arrival (TOA), and decode the 1090 MHz reply transmissions 415 from each transponder-equipped aircraft 410. Central workstation 400 computes the RTDTs with associated EOPs 425, 435 and TDOA with associated LOP 440. The intersection of the EOP 425 435 and the LOP 440 includes both a true position of transponder-equipped aircraft 410 and a false position 445. Resolution of the true transponder-equipped aircraft 410 position from the false position is performed by one or more of the following methods:

1. Receiver Direction Resolution—Single sector or multi-sector directional antennas are supplied with one or more 1090 MHz remote receivers 420, 430. Position solutions that are in the coverage of the antenna(s) are given a higher probability of being valid position solutions, than position solutions that are not in the coverage of the antenna(s).

2. Interrogator Direction Resolution—Single sector or multi-sector directional antennas are supplied with one or more 1030 MHz remote transmitters 450. Position solutions that are in the coverage of the antenna(s) or those that match the probable solution from a given interrogation beam directed in a specific direction are given a higher probability of being valid position solutions, than position solutions that are not in the coverage of the antenna(s).

3. Track Reasonableness Resolution—A position solution that is within a track position certainty window for the target is given higher probability of being a valid position solution, than a position solution that is outside the track position certainty window.

4. Track Signal Strength—Utilizing response signal strength changes in the response from the aircraft to determine probable best solution by examining the direction of the aircraft relative to the receivers.

Figure 5:
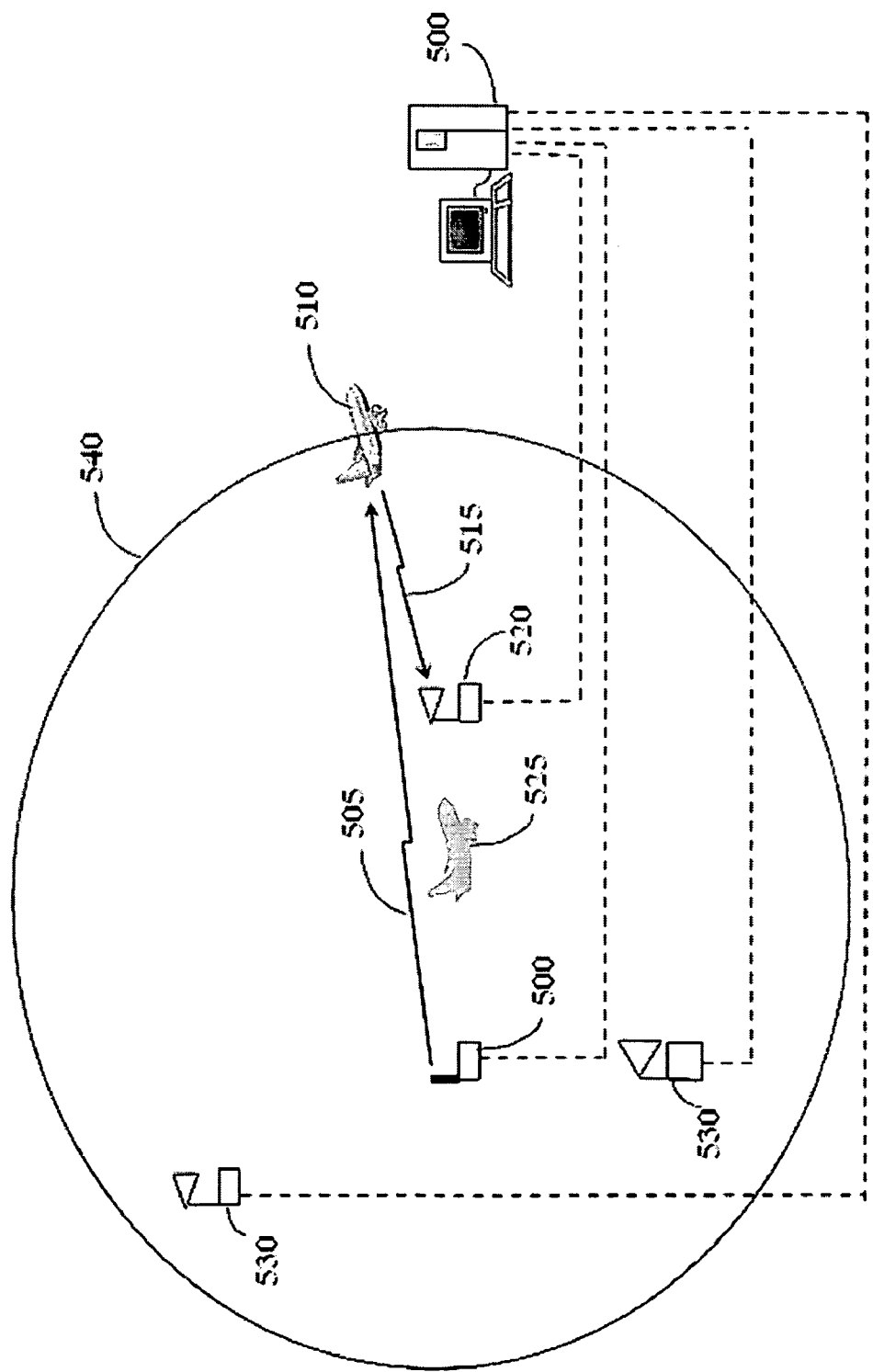
FIG. 5 is a diagram depicting the concept of using elliptical-based surveillance to resolve false targets.

As illustrated in FIG. 5, the hybrid elliptical/multilateration based surveillance ground system provides resolution of true transponder-equipped aircraft 510 position from false position 525 for a transponder-equipped aircraft 510. The multilateration based surveillance method and the elliptical based surveillance method will generate two or more position solutions for a target when a minimum number of 1090 MHz remote receivers are available. The central workstation 500 computes the TDOA and the associated Ellipse of Position 540 using the elliptical based surveillance method. The central workstation 500 uses the EOP 540 to resolve the true position 510 of transponder-equipped aircraft from the false position 525. The true position 510 of transponder-equipped aircraft is proximate the EOP 540 and the false position 525 is not proximate to the EOP 540.

Figure 6:
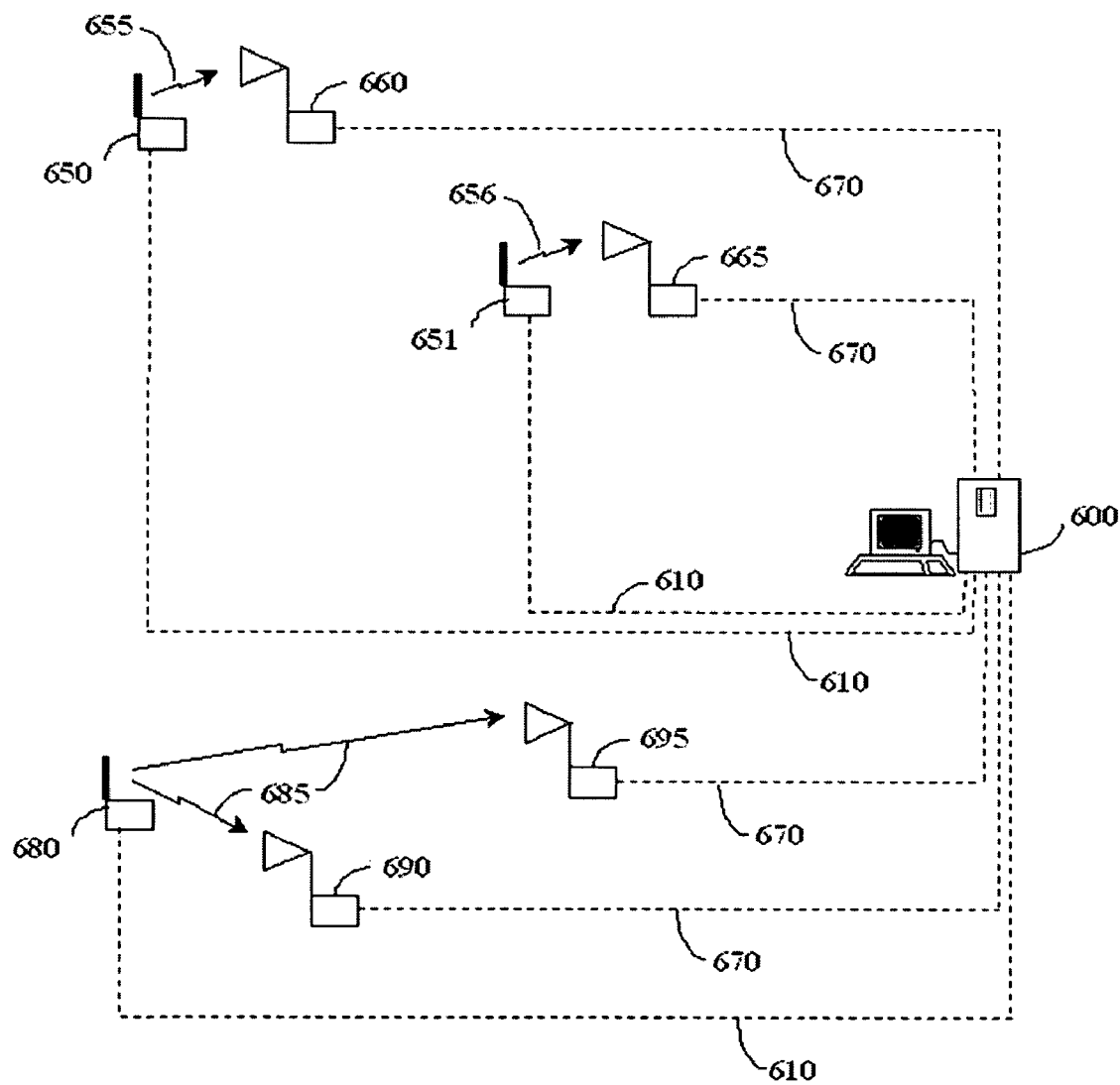
FIG. 6 is a diagram depicting the concept of synchronized sensor integrity monitoring.

FIG. 6 illustrates system integrity monitoring of the hybrid elliptical/multilateration based surveillance ground system, elliptical based surveillance ground system, hybrid range/multilateration based surveillance system, and multilateration based surveillance ground system is performed using the full coverage synchronized sensor integrity monitoring concept. Integrity monitoring is performed to verify that the surveillance ground system is correctly performing target identification and position surveillance. Two or more remote reference transmitters 650, 651, 680 transmit 1090 MHz integrity transmissions 655, 656, 685 to two or more 1090 MHz remote receivers 660, 665, 690, 695. Integrity monitoring is configured with a single remote reference transmitter 650 provides 1090 MHz integrity transmissions 655 to a single 1090 MHz remote receiver 660.

Integrity monitoring can also be configured with a single remote reference transmitter 680 providing 1090 MHz integrity transmissions 685 to two or more 1090 MHz remote receivers 690, 695. All remote reference transmitters 650, 651, 680 are precisely synchronized with common time reference, such as a GPS circuit board timing signal. Central workstation 600 provides 1090 MHz integrity transmission time schedule message over a data link 610 to each remote reference transmitter 650, 651, 680. As a minimum, integrity transmission time schedule message includes the Mode-S message type, 24-bit address and the time of 1090 MHz integrity transmission. Remote reference transmitters 650, 651, 680 may be set to a common and unique test designated 24-bit address.

A fixed 1090 MHz transmissions time schedule can also be programmed in the remote reference transmitters 650 651 680 on installation, such that a data link 610 is not required. Each 1090 MHz remote receiver 660, 656, 690, 695 receives, measures TOA, and decodes the 1090 MHz integrity transmissions 655, 656, 685. Each 1090 MHz remote receiver 660, 665, 690, 695 sends the TOA and decoded 1090 MHz integrity transmissions data to the central workstation 600 over a data link 670. Central workstation 600 verifies that the TOA and decoded 1090 MHz integrity transmissions data is accurate and correct. Central workstation 600 interprets the TOA and decoded 1090 MHz integrity transmissions data as coming from a single ghost 1090 MHz integrity transmitter, as a single common and unique test designated address is used for all remote reference transmitter 650, 651, 680.

Central workstation 600 calculates the position of the ghost 1090 MHz integrity transmitter using any of the following surveillance methods: elliptical-based surveillance method, multilateration-based surveillance method, hybrid elliptical/multilateration-based surveillance method and hybrid range/multilateration-based surveillance method. The integrity monitoring function of the central workstation 600 compares the calculate position for the ghost 1090 MHz integrity transmitter to the expected computation value of the position to identify system integrity errors.

Figure 7:
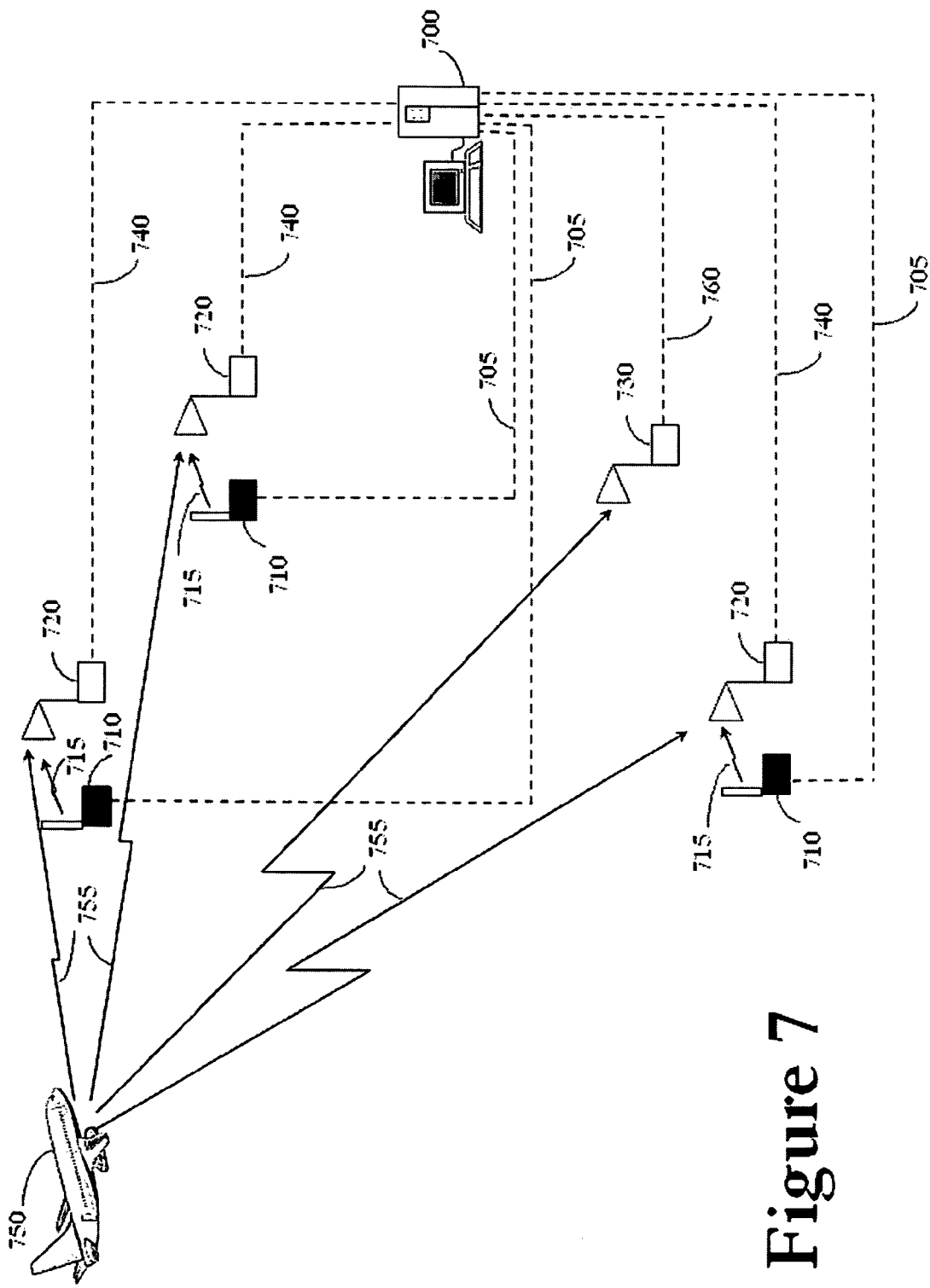
FIG. 7 is a diagram depicting the concept of a hybrid system integrity monitoring with synchronized and unsynchronized transmitters.
Figure 8:
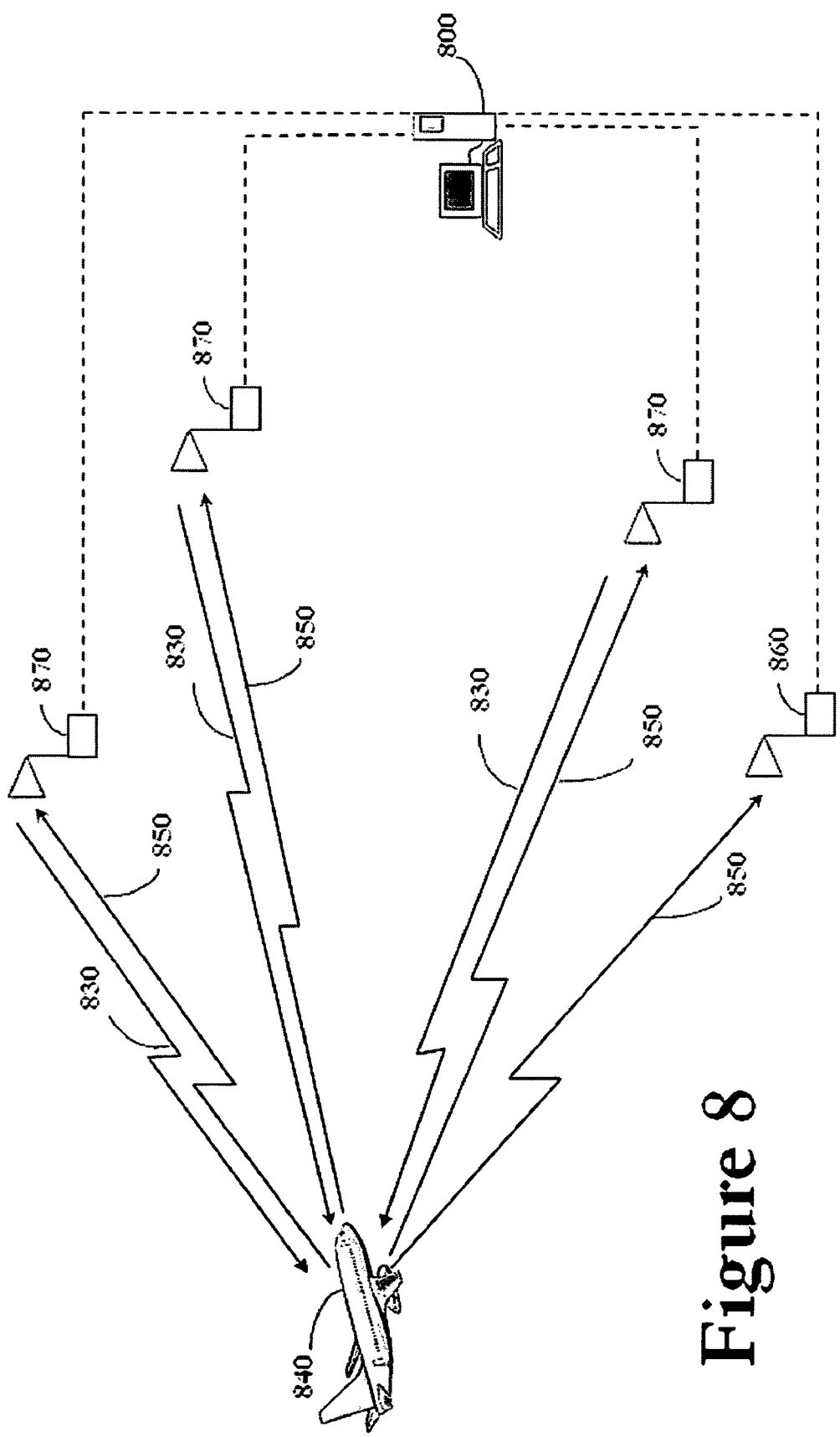
FIG. 8 is a diagram depicting synchronized range-based surveillance concept.

System integrity monitoring of the hybrid elliptical/multilateration based surveillance ground system, elliptical based surveillance ground system, hybrid range/multilateration based surveillance system and multilateration based surveillance ground system is performed using the partial coverage synchronized sensor integrity monitoring concept, as illustrated in FIG. 7. The method provides a means to verify all system elements, including out-of-view 1090 MHz remote receivers 730 that do not receive 1090 MHz integrity transmissions 715. Integrity monitoring is performed to verify that the surveillance ground system is correctly performing target identification and position surveillance.

Two or more remote reference transmitters 710 transmit 1090 MHz integrity transmissions 715 to two or more 1090 MHz remote receivers 720. One or more out-of-view 1090 MHz remote receivers 730 are not in view of any remote reference transmitters 710 and do not receive the 1090 MHz integrity transmissions 715. All remote reference transmitters 710 are precisely synchronized with common time reference, such as a GPS circuit board timing signal. The central workstation 700 provides a 1090 MHz integrity transmission time schedule message over a data link 705 to each remote reference transmitter 710. As a minimum, integrity transmission time schedule message includes the Mode-S message type, 24-bit address and the time of 1090 MHz integrity transmission.

Remote reference transmitters 710 are set to a single common and unique test-designated 24-bit address. A fixed 1090 MHz transmissions time schedule can also be programmed in the remote reference transmitter on installation, such that a data link 705 is not required. Each 1090 MHz remote receiver 720 receives, measures TOA and decodes the 1090 MHz integrity transmissions 715. Each 1090 MHz remote receiver 720 sends the TOA and decoded 1090 MHz integrity transmissions data to the central workstation 700 over a data link 740. The integrity monitoring function in the central workstation 700 verifies that the TOA and decoded 1090 MHz integrity transmissions data is accurate and correct. Central workstation 700 interprets the TOA and decoded 1090 MHz integrity transmissions data as coming from a single ghost 1090 MHz integrity transmitter, because a single common and unique test address is used for all remote reference transmitters 710.

Central workstation 700 calculates the position of the ghost 1090 MHz integrity transmitter using any of the following surveillance methods: elliptical-based surveillance method, multilateration-based surveillance method, hybrid elliptical/multilateration-based surveillance method and hybrid range/multilateration-based surveillance method. The integrity monitoring function of central workstation 700 compares the calculate position for the ghost 1090 MHz integrity transmitter to the expected computation value of the position to identify system integrity errors. Once system integrity is verified with all in-view 1090 MHz remote receiver 720, system integrity with out-of-view 1090 MHz remote receiver 730 is verified using transponder-equipped aircraft 750 1090 MHz reply transmissions 755. Each 1090 MHz remote receiver 720 730 receives, measures TOA and decodes the 1090 MHz reply transmissions 755. Each 1090 MHz remote receiver 720 730 sends the TOA and decoded 1090 MHz reply transmissions data to the central workstation 700 over a data link 740.

The integrity monitoring function in the central workstation 700 verifies that the TOA and decoded 1090 MHz reply transmission data from the out-of-view 1090 MHz remote receiver 730 is accurate and correct. The integrity monitor function in the central workstation 700 verifies that the decoded 1090 MHz reply transmission data from out-of-view 1090 MHz remote receiver 730 is the consistent with the decoded 1090 MHz reply transmission data from the integrity verified 1090 MHz remote receivers 720. The integrity monitor function in the central workstation 700 verifies that the TOA value for the 1090 MHz reply transmission 755 from the out-of-view 1090 MHz remote receiver 730 is the consistent with the expected TOA value derived from the computed position using only the integrity verified in-view 1090 MHz remote receivers 720.

A variation of the hybrid elliptical/multilateration based surveillance ground system is the hybrid range/multilateration based surveillance ground system. The hybrid range/multilateration based surveillance ground system uses one or more standalone 1090 MHz remote receivers 860 and one or more co-located 1030 MHz remote transmitters/1090 MHz remote receivers 870 that share the same antenna. The standalone 1090 MHz remote receivers 860 and the co-located 1030 MHz remote transmitters/1090 MHz remote receivers 870 are synchronized to a common high accuracy time reference source, such as Global Positioning System (GPS). The common high accuracy time reference is used to control the precise timing of 1030 MHz interrogations 830 from each of the co-located 1030 MHz remote transmitters/1090 MHz remote receivers 870.

Transponder-equipped aircraft 840 transmits 1090 MHz reply transmission 850 in response to each 1030 MHz interrogation 830. Each standalone 1090 MHz remote receiver 860 and co-located 1030 MHz remote transmitters/1090 MHz remote receivers 870 receives, measures Time Of Arrival (TOA) and decodes the 1090 MHz reply transmissions 850 from each transponder-equipped aircraft 840. The central workstation 800 processes the TOA and decoded 1090 MHz reply transmissions to compute RTDT and TDOA. Central workstation 800 computes elliptical-based surveillance target position.

Central workstation 800 uses precision timing to control the scheduling of 1030 MHz interrogation 830 with timing accuracies better than 10 milliseconds. The 1030 MHz interrogations 830 from two or more co-located 1030 MHz remote transmitters/1090 MHz remote receivers 870 are schedule to occur in a sequence of closely spaced interrogations. The RTDT for each of the co-located 1030 MHz remote transmitters/1090 MHz remote receivers 870 are processed by central workstation 800 to compute the position of each target. The position of the transponder-equipped aircraft 840 is the intersection of the COP associated with each co-located 1030 MHz remote transmitters/1090 MHz remote receivers 870.

Figure 9:
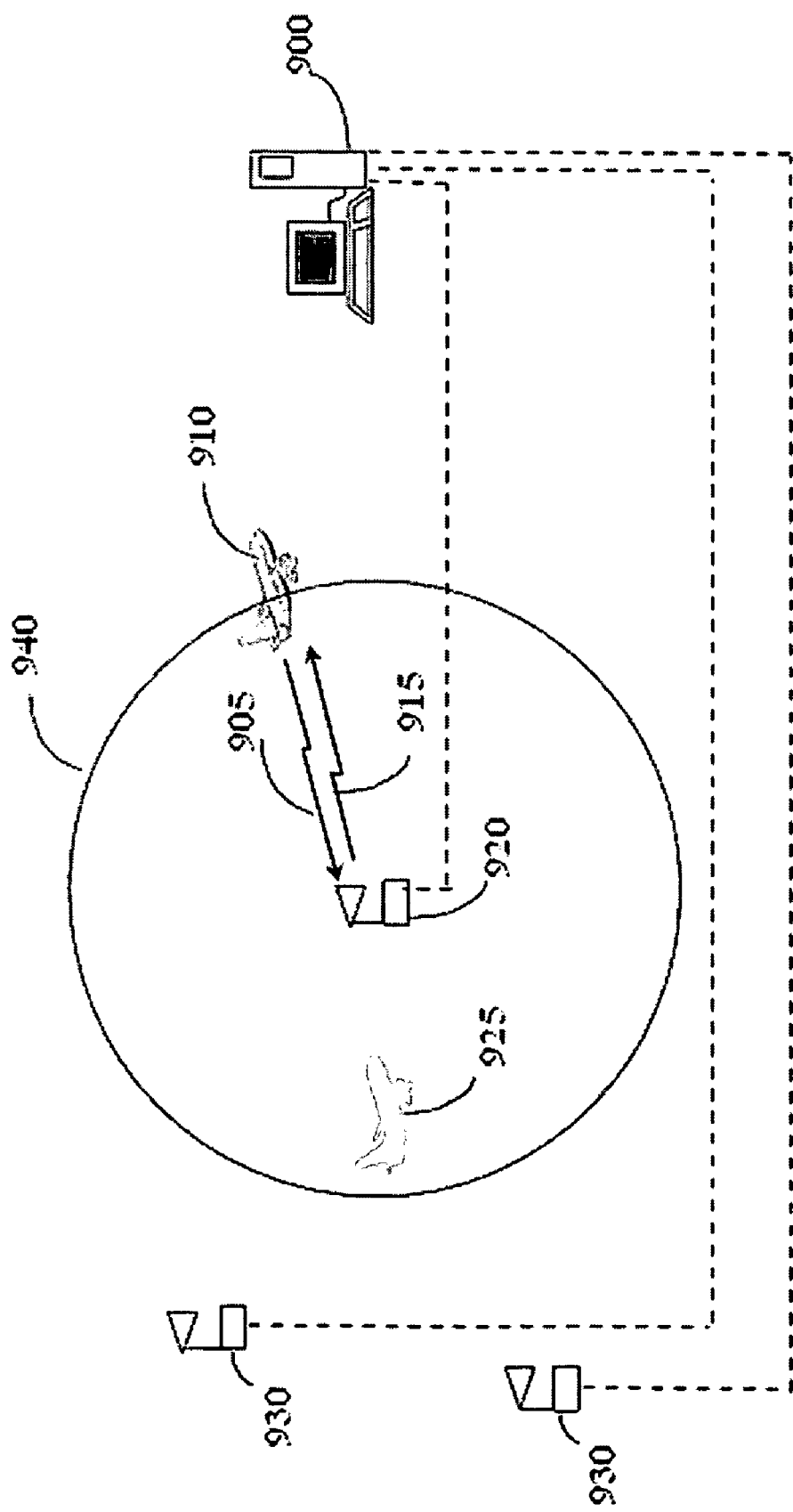
FIG. 9 is a diagram depicting the concept of using range-based surveillance to resolve false targets.

The hybrid range/multilateration based surveillance ground system provides resolution of true transponder-equipped aircraft 910 position from false position 925 associated with transponder-equipped aircraft 910, as illustrated in FIG. 9. The multilateration based surveillance method and the range based surveillance method will generate two or more position solutions for a target when a minimum number of 1090 MHz remote receivers are available. To resolve the true position of the transponder-equipped aircraft 910 from false position 925, one or more collocated 1090 MHz remote receivers/interrogators 920 will perform a 1030 MHz interrogation 915 and transponder-equipped aircraft 910 will generate a 1090 MHz reply transmission 950. Central workstation 900 computes the RTDT and the associated Circle of Position 940. The COP 940 generated by the range based surveillance method is used to resolve the true position of transponder-equipped aircraft 910 from false position 925. The true position of transponder-equipped aircraft 910 is proximate to COP 940 and false position 925 is not proximate to COP 940, as illustrated in FIG. 9.

Figure 10:
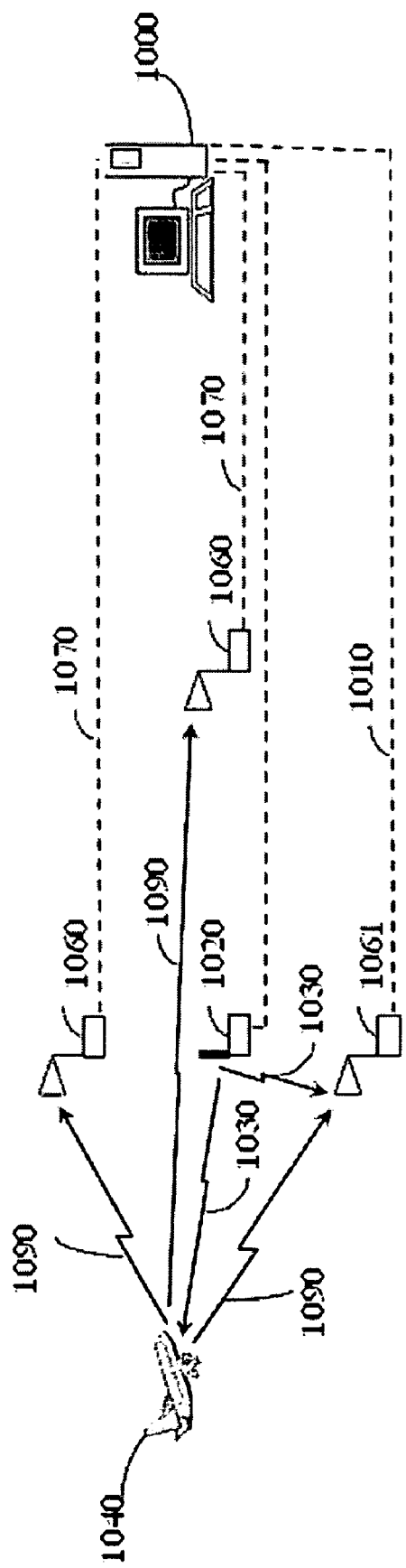
FIG. 10 is a diagram depicting the elliptical-based surveillance concept using unsynchronized remote transmitters.

An unsynchronized remote transmitter elliptical-based surveillance ground system comprising one or more 1090 MHz remote receivers 1060, one or more 1030 MHz remote transmitters 1020, one or more 1030 MHz remote receivers 1061 and a central workstation 1000 may be used to position and identification surveillance of one or more transponder-equipped aircraft 1040, as illustrated in FIG. 10. 1030 MHz remote receiver 1061 and 1090 MHz remote receivers 1060 are time-synchronized to a common precision accuracy time reference source, such as Global Positioning System (GPS). 1030 MHz remote transmitter 1020 transmits a 1030 MHz interrogation signal 1030.

Central workstation 1000 controls the time of transmission of 1030 MHz remote transmitter 1020 with a timing accuracy which is not required to be as precise as for the 1090 MHz remote receivers 1060 and 1030 MHz remote receiver 1061. Each 1030 MHz remote receiver 1061 receives 1030 MHz interrogation signal 1030 and provides a precise TOA and type of interrogation to central workstation 1000 by data message over communications link 1010. Central workstation 1000 computes the time of transmission of 1030 MHz interrogation signal 1030 by subtracting the computed transmission time from the TOA measured by 1030 MHz remote receiver 1061. The computed transmission time is equal to the distance between the 1030 MHz remote transmitter 1020 and the 1030 MHz remote receivers 1061 divided by the speed of light.

One or more transponder-equipped aircraft 1000 receive 1030 MHz interrogation signal 1030s. Each transponder-equipped aircraft 1000 generates a 1090 MHz reply transmission 1050. Each 1090 MHz remote receiver 1060 receives reply transmission 1050, measures Time Of Arrival (TOA), and decodes the 1090 MHz reply transmissions 1050 from each transponder-equipped aircraft 1040. Each 1090 MHz remote receiver 1060 sends the TOA and decoded 1090 MHz reply transmissions 1050 data to central workstation 1000 over data link 1070. The central workstation 1000 computes the Round Trip Delay Time (RTDT) for each 1090 MHz remote receiver 1060, which equals the TOA minus the Time of Transmission (TOT). The elliptical-based surveillance method is used to compute transponder-equipped aircraft 1040 position. The time the interrogation signal was first transmitted is the TOT (on a frequency of 1030 MHz). That signal then travels through space and is detected by a transponder system on an aircraft. The transponder system then generates and transmits a reply message (on 1090 MHz), which then has to travel back to the receiver and is detected at time TOA.

Figure 11:
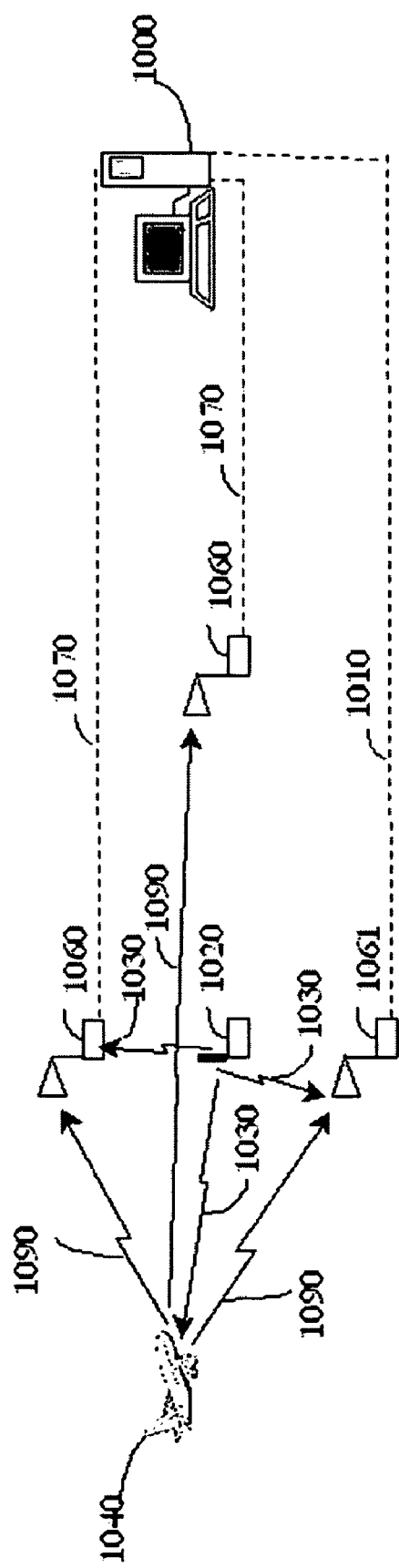
FIG. 11 is a block diagram illustrating another embodiment of the system of FIG. 10, where the transmission of interrogation signal occurs from an interrogator of known position but time of transmission is not known and must be calculated from TOA at receivers using TOT, TOA, and distance traveled.

FIG. 11 illustrates another embodiment of the system of FIG. 10, where the transmission of interrogation signal occurs from interrogator of known position but time of transmission is not known and must be calculated from TOA at receivers 1060 and/or 1061 using TOT, TOA, and distance traveled. In this embodiment, Central server 1000 is not connected to interrogator 1020 in any way and calculates the time of transmission from TOA at one or more receivers.

Figure 12:
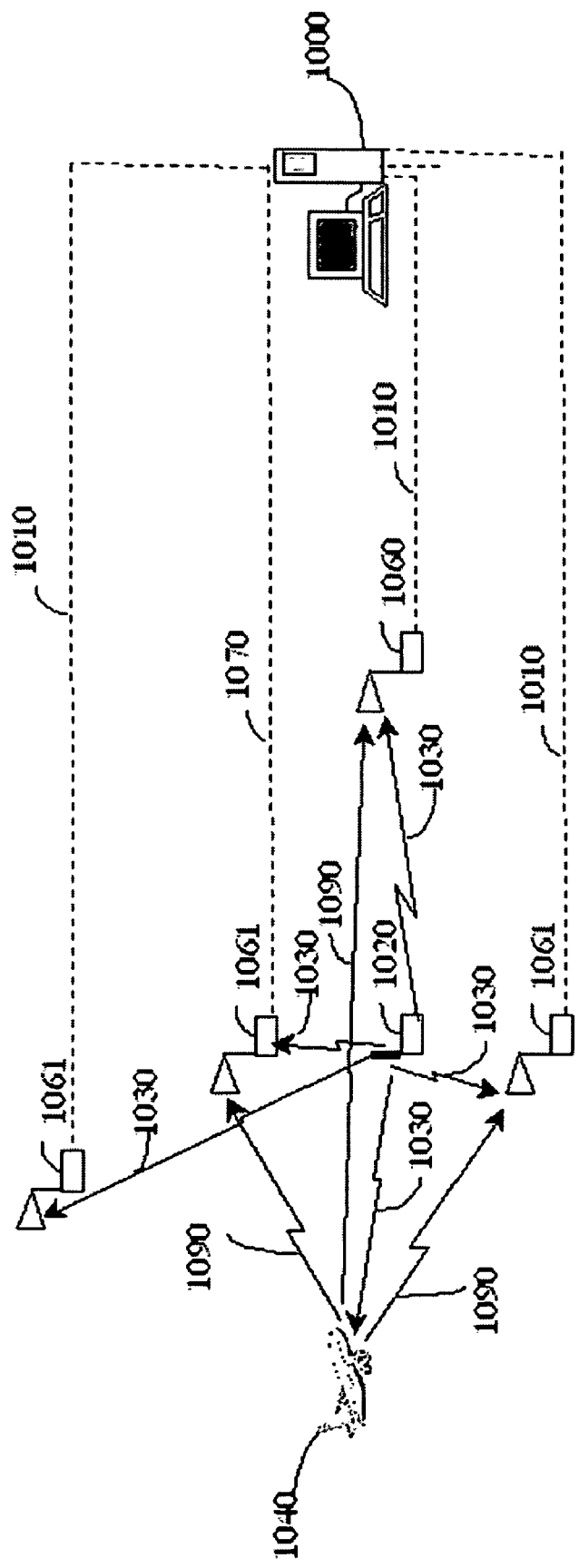
FIG. 12 illustrates yet another embodiment of the system of FIG. 10, where the time of transmission and position of a transmitter is not known and must be calculated from TDOA (Mlat) at the 1030 MHz/1090 MHz receivers.

FIG. 12 illustrates yet another embodiment of the system of FIG. 10, where the time of transmission and position of transmitter 1020 is not known and must be calculated from TDOA (Mlat) at 1030 MHz/1090 MHz receivers 1061. In this embodiment, central server 1000 is not connected to interrogator 1020 in any way but does determine the position of the interrogator at the time of transmission. Once known, the time and position of the transmitter are used to determine the location of a target 1040 based on its response to the interrogation from 1020. Interrogator being tracked 1020 could be that of another aircraft in range whose position at any time has been determined and is known accurately.

Figure 13:
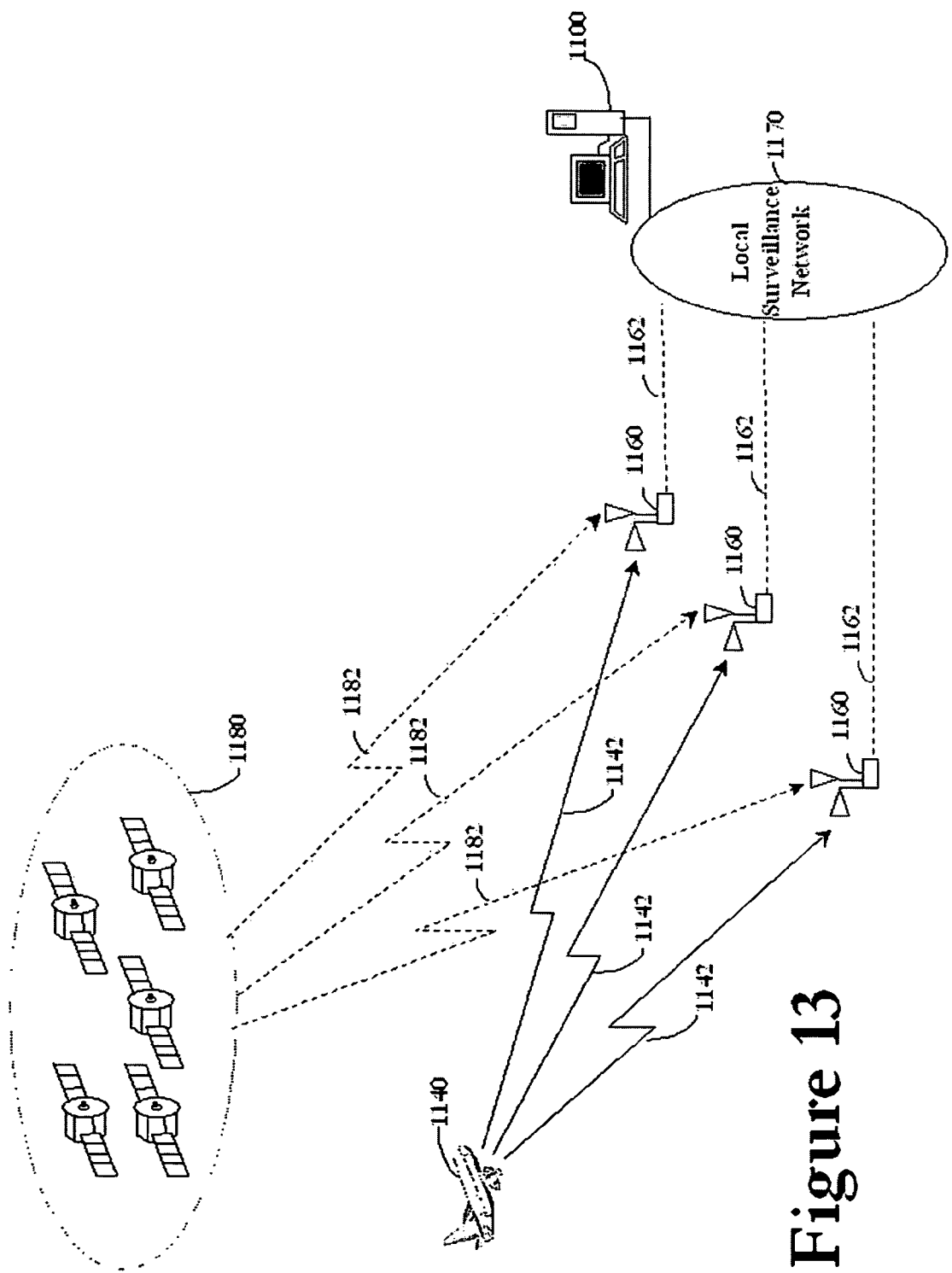
FIG. 13 is a diagram depicting the concept of a satellite time referenced multilateration surveillance system.

FIG. 13 is a diagram depicting the concept of a satellite time referenced multilateration surveillance system. The satellite time referenced multilateration based surveillance ground system of FIG. 13 comprises, as a minimum, one or more 1090 MHz remote receivers 1160, local surveillance network 1170, and a central workstation 1100 is used for position and identification surveillance of one or more transponder-equipped aircraft 1140. Each 1090 MHz remote receiver 1160 receives satellite transmission 1182 from a satellite network 1180, such as Global Positioning System (GPS). Each 1090 MHz remote receiver 1160 uses satellite transmissions 1182 to perform time synchronization to the satellite network 1180 fixed time reference standard, such as Universal Coordinate Time (UTC). Each transponder-equipped aircraft 1140 generates a 1090 MHz reply transmission 1142 in accordance with the *Minimum Operational Performance Standards For Air Traffic Control Radar Beacon System/Mode Select (ATCRBS/MODE S) Airborne Equipment,* RTCA/DO-181, incorporated herein by reference.

Each 1090 MHz remote receiver 1160 receives, decodes, and measures Time of Arrival (TOA) of the 1090 MHz reply transmission 1142. Each 1090 MHz remote receiver 1160 measures 1090 MHz reply transmission 1142 TOA, time referenced to the fixed time reference standard. Each 1090 MHz remote receiver 1160 sends the TOA and decoded 1090 MHz reply transmissions 1142 data to local surveillance network 1170 and to a central workstation 1100 over data link 1162. Central workstation 1100 computes the Time Difference of Arrival (TDOA) between the satellites time synchronized TOA measurements for each 1090 MHz reply transmission 1142 to triangulate and/or multilaterate a position.

Each 1090 MHz remote receiver 1160 also sends the TOA and decoded 1090 MHz reply transmissions 1142 data to global surveillance network 1110 to share the data between two or more local surveillance networks 1170. The global surveillance network enables two or more multilateration based surveillance ground systems to share TOA and decoded 1090 MHz reply transmissions 1142 data from one or more 1090 MHz remote receivers 1160. The fixed time reference standard is used by all 1090 MHz remote receivers 1160 of the satellite time referenced multilateration based surveillance ground system to establish a common time reference between systems.

Figure 14:
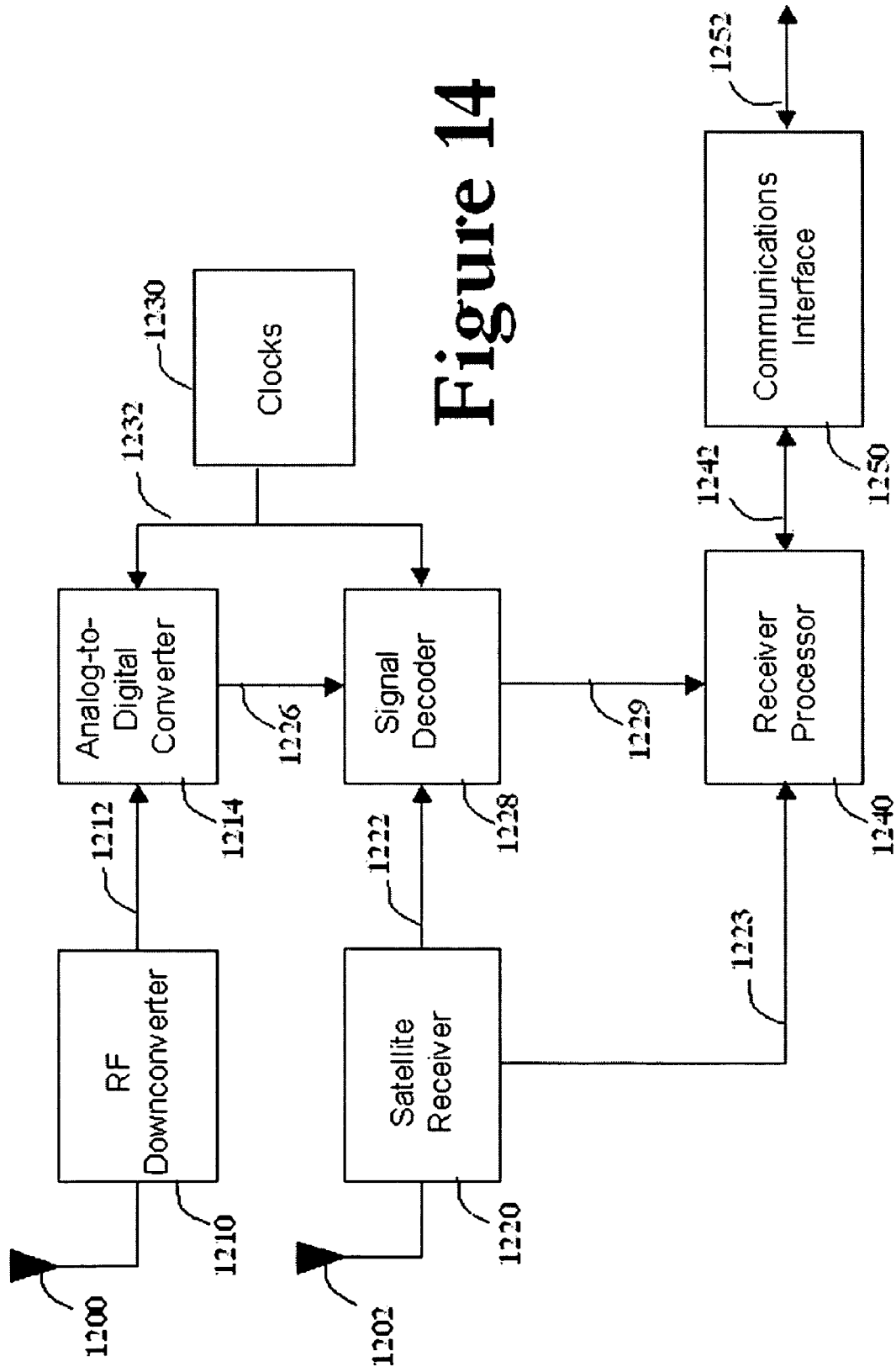
FIG. 14 is a diagram depicting a block diagram of a 1090 MHz remote receiver in the satellite time referenced multilateration surveillance system of FIG. 13.

FIG. 14 is a diagram depicting a block diagram of a 1090 MHz remote receiver 1160 in the satellite time referenced multilateration surveillance system of FIG. 13. As Illustrated in FIG. 14, the 1090 MHz remote receiver uses satellite timing signals received from the satellite receiver antenna 1202 and processed by the satellite receiver 1220 to provide a time reference for TOA measurements. Satellite receiver 1220 provides a synchronization pulse 1222 to signal decoder 1228. This synchronization pulse 1222 provides signal decoder 1228 with an indication of the start of a timing period of one second or less. Signal decoder 1228 maintains a counter trained to synchronization pulse 1222. Satellite receiver 1220 provides receiver processor 1240 with a reference time (e.g., UTC time) 1223 corresponding to each synchronization pulse 1222.

1090 MHz antenna 1200 receives 1090 MHz reply transmissions. 1090 MHz reply transmissions are passed through RF Downconverter 1210 where they are converted from 1090 MHz to an intermediate frequency signal 1212. Analog-to-digital converter 1214 converts intermediate frequency signal 1212 to a digital signal 1226. Signal decoder 1228 measures the TOA and decodes the data bits from the digital signal 1226. TOA/decoded bit data 1229 is sent to the receiver processor 1240. Clocks 1230 are used to provide local oscillator signals 1232 to the analog-to-digital converter 1214 and the signal decoder 1228.

Receiver processor 1240 adds reference time 1223 with the TOA value provided in the TOA/decoded bit data 1229 to compute the standard time reference TOA. Receiver processor 1240 decodes bit data provided in TOA/decoded bit data 1229 to create reply messages in accordance with *Minimum Operational Performance Standards For Air Traffic Control Radar Beacon System/Mode Select (ATCRBS/MODE S) Airborne Equipment,* RTCA/DO-181, incorporated herein by reference. Receiver processor 1240 sends standard time reference TOA/reply message data 1242 to communications interface 1250. Formatted standard time reference TOA/reply message data 1252 is sent by communications interface 1250 to local surveillance network 1170 illustrated in FIG. 13.

Figure 15:
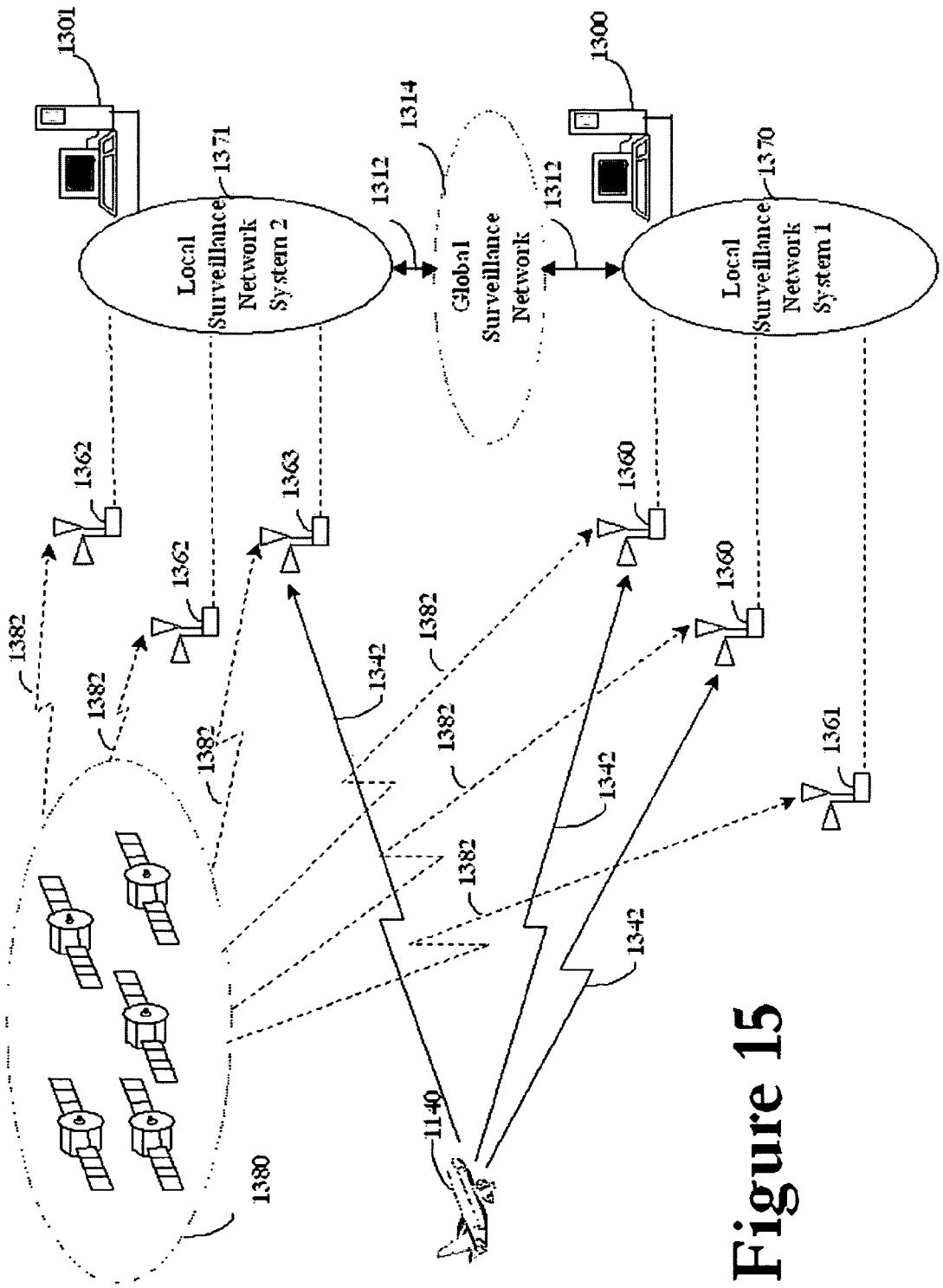
FIG. 15 is a diagram depicting the concept of sharing 1090 MHz remote receiver data with two or more satellite time referenced multilateration surveillance systems.

FIG. 15 is a diagram depicting the concept of sharing 1090 MHz remote receiver data with two or more satellite time referenced multilateration surveillance systems. As illustrated in FIG. 15, two satellite time referenced multilateration based surveillance ground systems share TOA and decoded 1090 MHz reply transmission data from 1090 MHz remote receivers 1360, 1361, 1362, 1363 via a global surveillance network 1314. All systems use a common format for TOA and decoded 1090 MHz reply transmission data. Sharing TOA and decoded 1090 MHz reply transmission data enables each satellite time referenced multilateration based surveillance ground system to augment surveillance of other satellite time referenced multilateration based surveillance ground systems.

In a first system (System 1), the satellite time referenced multilateration based surveillance ground system comprises, as a minimum, one or more 1090 MHz remote receivers 1360, 1361, local surveillance network 1370, and a central workstation 1300. In a second system (System 2), satellite time referenced multilateration based surveillance ground system comprises of as a minimum one or more 1090 MHz remote receivers 1362, 1363 local surveillance network 1371, and a central workstation 1301. TOA and decoded 1090 MHz data from the first system and the second system are sent to a global surveillance network 1314 via communications links 1312. The central processor 1301 for the System 2 has access to any other system's TOA and decoded 1090 MHz data via the global surveillance network 1314.

1090 MHz remote receivers 1360, 1361, 1362, 1363 for all systems receive satellite transmissions 1382 from a satellite network 1380 for the purpose of synchronization. Each 1090 MHz remote receiver 1360 of System 1 receives, decodes, and measures Time of Arrival (TOA) of the 1090 MHz reply transmission 1342. Each 1090 MHz remote receiver 1360 measures 1090 MHz reply transmission 1342 TOA is time referenced to the fixed time reference standard.

FIG. 15 illustrates the case where only two 1090 MHz remote receivers 1360 from System 1 receive a 1090 MHz reply transmission 1342 and only one 1090 MHz remote receiver 1363 from System 2 receives a 1090 MHz reply transmission 1342. Data from three or more 1090 MHz remote receivers is required for the central processor 1300 to triangulate and/or multilaterate an aircraft position. System 1 central processing 1300 can compute an aircraft position by receiving System 2 TOA and 1090 MHz decode data. System 2 central processing 1301 can compute an aircraft position by receiving System 1 TOA and 1090 MHz decode data.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A target position locating system for generating position data for a plurality of targets, the system comprising:
   one or more transmitters for transmitting a transmit signal to a target at a transmit signal Time of Transmission (TOT) for each transmitted signal;
   one or more system receivers for receiving a target return signal corresponding to each transmit signal and measuring target return signal Time of Arrival (TOA);
   a processor for synchronizing a transmit signal TOT and a target return signal TOA measurements to a system precision time reference and correlating a target return signal TOA to a corresponding transmit signal TOT, calculating the Round Trip Delay Time (RTDT) for each correlated transmit signal TOT and return signal TOA, and calculating the target's Ellipse of Position (EOP) for each RTDT.

2. The target position locating system of claim 1, wherein the processor further calculates two-dimensional (x,y) target position using the RTDT and EOP data.

3. The target position locating system of claim 1, wherein the processor further calculates three-dimensional (x,y,z) target position using the RTDT and EOP data.

4. The target position locating system of claim 1, wherein the processor further detects false targets using one or more RTDT and EOPs.

5. The target position locating system of claim 1, further comprising:
   one or more transmit signal receivers for receiving the transmit signal from the one or more transmitters and determining the transmit signal Time of Transmission (TOT) for each transmitted signal;
   wherein the TOT is determined by measuring TOA of the transmit signal from one or more transmit signal receivers and subtracting the known transmission time between a corresponding transmitter and each transmit signal receiver.

6. The target position locating system of claim 5, wherein the transmit signal receivers are precision time synchronized to a common system reference time and have line-of-sight with at least one of one or more transmitters.

7. The target position locating system of claim 6, wherein one or more of satellite-based timing, precision clocks, and reference transmissions are used to synchronize the one or more transmitters.

8. The target position locating system of claim 1, wherein the processor precisely schedules transmit signal TOT and coordinate this schedule with each transmitter.

9. The target position locating system of claim 8, wherein the transmitters and return signal receivers are precision time synchronized to a common system reference time.

10. The target position locating system of claim 1, wherein the return signal receivers are precision time synchronized to a common system reference time.

11. The target position locating system of claim 1, wherein antennas for the one or more return signal receivers and antennas for the one or more the transmitters are separated by a fixed distance at survey positions.

12. The target position locating system of claim 1, wherein target position is calculated from two or more EOPs.

13. A target position locating system for generating position data for a plurality of targets, the system comprising:
   one or more transmitters for transmitting a transmit signal to a target and determining the transmit signal Time of Transmission (TOT) for each transmitted signal;
   one or more system receivers for receiving a target return signal corresponding to each transmit signal and measuring target return signal Time of Arrival (TOA);
   a processor for synchronizing a transmit signal TOT and a target return signal TOA measurements to a system precision time reference, correlating return signal TOA measurements of a return signal received at two or more receivers, calculating Time Difference of Arrival (TDOA) for all combinations of receiver pairs of correlated return signal TOA measurements, and calculating a Line of Position (LOP) for each TDOA for the target.

14. The target position locating system of claim 13, wherein the processor calculates two-dimensional (x,y) target position using the TDOA and LOP data.

15. The target position locating system of claim 13, wherein the processor calculates three-dimensional (x,y,z) target position using the TDOA and LOP data.

16. The target position locating system of claim 13, wherein the processor further detects false targets using one or more TDOA and LOPs.

17. The target position locating system of claim 13, further comprising:
   one or more transmit signal receivers for receiving the transmit signal from the one or more transmitters and determining the transmit signal Time of Transmission (TOT) for each transmitted signal;

wherein the TOT is determined by measuring TOA of the transmit signal from one or more transmit signal receivers and subtracting the known transmission time between a corresponding transmitter and each transmit signal receiver.

18. The target position locating system of claim 13, wherein the transmit signal receivers are precision time synchronized to a common system reference time and have line-of-sight with at least one of one or more transmitters.

19. The target position locating system of claim 18, wherein one or more of satellite-based timing, precision clocks, and reference transmissions are used to synchronize the one or more transmitters.

20. The target position locating system of claim 13, wherein the processor precisely schedules transmit signal TOT and coordinate this schedule with each transmitter.

21. The target position locating system of claim 20, wherein the transmitters and return signal receivers are precision time synchronized to a common system reference time.

22. The target position locating system of claim 13, wherein the return signal receivers are precision time synchronized to a common system reference time.

23. The target position locating system of claim 13, wherein antennas for the one or more return signal receivers and antennas for the one or more the transmitters are separated by a fixed distance at survey positions.

24. The target position locating system of claim 13, wherein target position is calculated from one or more EOP and one or more LOP.

25. A target position locating system for generating position data for a plurality of targets, the system comprising:
one or more transmitters for transmitting a transmit signal to a target and determining the transmit signal Time of Transmission (TOT) for each transmitted signal;
one or more system receivers for receiving a target return signal corresponding to each transmit signal and measuring target return signal Time of Arrival (TOA);
a processor for synchronizing a transmit signal TOT and a target return signal TOA measurements to a system precision time reference and correlating a target return signal TOA to a corresponding transmit signal TOT, calculating the Round Trip Delay Time (RTDT) for each correlated transmit signal TOT and return signal TOA, calculating the target's Ellipse of Position (EOP) for each RTDT, correlating return signal TOA measurements of a return signal received at two or more receivers, calculating Time Difference of Arrival (TDOA) for all combinations of receiver pairs of correlated return signal TOA measurements, and calculating a Line of Position (LOP) for each TDOA for the target.

26. The target position locating system of claim 25, wherein the processor calculates two-dimensional (x,y) target position using position using RTDT, TDOA, EOP and LOP data.

27. The target position locating system of claim 25, wherein the processor calculates three-dimensional (x,y,z) target position using position using RTDT, TDOA, EOP and LOP data.

28. The target position locating system of claim 25, wherein the processor further detects false targets using one or more RTDT and EOPs.

29. The target position locating system of claim 25, wherein the processor further detects false targets using one or more TDOA and LOPs.

30. The target position locating system of claim 25, further comprising:
one or more transmit signal receivers for receiving the transmit signal from the one or more transmitters and determining the transmit signal Time of Transmission (TOT) for each transmitted signal;
wherein the TOT is determined by measuring TOA of the transmit signal from one or more transmit signal receivers and subtracting the known transmission time between a corresponding transmitter and each transmit signal receiver.

31. The target position locating system of claim 30, wherein the transmit signal receivers are precision time synchronized to a common system reference time and have line-of-sight with at least one of one or more transmitters.

32. The target position locating system of claim 31, wherein one or more of satellite-based timing, precision clocks, and reference transmissions are used to synchronize the one or more transmitters.

33. The target position locating system of claim 25, wherein the processor precisely schedules transmit signal TOT and coordinate this schedule with each transmitter.

34. The target position locating system of claim 33, wherein the transmitters and return signal receivers are precision time synchronized to a common system reference time.

35. The target position locating system of claim 25, wherein the return signal receivers are precision time synchronized to a common system reference time.

36. The target position locating system of claim 25, wherein antennas for the one or more return signal receivers and antennas for the one or more the transmitters are separated by a fixed distance at survey positions.

37. The target position locating system of claim 25, wherein target position is calculated from two or more EOPs.

38. The target position locating system of claim 25, wherein target position is calculated from one or more EOP and one or more LOP.

39. A target position locating system for generating position data for a plurality of targets, the system comprising:
means for receiving at one or more system receiver sites, a target signal from the target corresponding to a transmit signal from the target;
means for measuring target signal Time of Arrival (TOA);
means for decoding target signal data transmissions;
means for synchronizing target signal TOA measurements to a satellite based time reference;
means for correlating return signal TOA measurements of a return signal received at two or more sites;
means for calculating the Time Difference of Arrival (TDOA) for all combinations of receive site pairs of correlated return signal TOA measurements; and
means for calculating the target's Line of Position (LOP) for each TDOA.

40. The target position locating system of claim 39, further comprising:
means for calculating the two-dimensional (x,y) and three-dimensional (x,y,z) target position using the TDOA.

41. The target position locating system of claim 39, further comprising:
means for communicating target signal TOA and decoded data transmissions to other surveillance systems.

42. The target position locating system of claim 39, further comprising:
means for receiving and processing target signal TOA and decoded data transmissions from other surveillance systems.

43. The target position locating system of claim 39, wherein the target signal TOA and decoded data transmissions are formatted in a standardized message format.

44. The target position locating system of claim 39, wherein the system receiver sites use satellite network to generate a periodic synchronization timing pulse for defining the start of a TOA measurement period.

45. The target position locating system of claim 39, wherein the system receiver sites uses satellite network to generate the time reference data for each synchronization timing pulse.

* * * * *